(12) United States Patent
Lee et al.

(10) Patent No.: US 11,144,190 B2
(45) Date of Patent: Oct. 12, 2021

(54) ELECTRONIC DEVICE AND METHOD FOR SHARING DATA THEREOF

(71) Applicant: Samsung Electronics Co., Ltd., Suwon-si (KR)

(72) Inventors: Yoojin Lee, Suwon-si (KR); Youngkyu Seon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/986,777

(22) Filed: Aug. 6, 2020

(65) Prior Publication Data
US 2021/0042002 A1 Feb. 11, 2021

(30) Foreign Application Priority Data
Aug. 6, 2019 (KR) .......... 10-2019-0095415

(51) Int. Cl.
*G06F 3/048* (2013.01)
*G06F 15/173* (2006.01)
(Continued)

(52) U.S. Cl.
CPC .......... *G06F 3/0486* (2013.01); *G06F 3/0481* (2013.01); *G06F 3/1454* (2013.01); *G06F 15/173* (2013.01)

(58) Field of Classification Search
CPC ..... G06F 3/0486; G06F 3/0481; G06F 3/1454
See application file for complete search history.

(56) References Cited

U.S. PATENT DOCUMENTS 8,190,707 B2 5/2012 Trivedi et al.
8,612,546 B2 12/2013 Trivedi et al.
(Continued)

FOREIGN PATENT DOCUMENTS

EP 3104620 A1 12/2016
KR 10-1345341 B1 12/2013
(Continued)

OTHER PUBLICATIONS

International Search Report dated Nov. 27, 2020 issued in International Application No. PCT/KR2020/010423.
(Continued)

*Primary Examiner* — Hugo Molina
(74) *Attorney, Agent, or Firm* — Jefferson IP Law, LLP

(57) ABSTRACT

An electronic device and a data sharing method of the electronic device are provided. The electronic device includes a touch screen display, an input/output interface connected to an external device, a memory, and at least one processor electrically connected to the touch screen display, the input/output interface, and the memory. The at least one processor is configured to output a screen associated with the electronic device within a window displayed in a first region of a display of the external device based on the electronic device being connected through the input/output interface to the external device using an operating system different from an operating system of the electronic device, to a sub-window corresponding to at least one application stored in the electronic device within the window, determine a target application based on the input based on an input to the sub-window being applied from the external device, set data reception path information based on a feature of the target application to transmit the set data reception path information to the external device, and receive data corresponding to the input from the external device based on the data reception path information. Other various embodiments as understood from the specification are also possible.

20 Claims, 13 Drawing Sheets

(51) Int. Cl.
  *G06F 3/0486* (2013.01)
  *G06F 3/0481* (2013.01)
  *G06F 3/14* (2006.01)

(56) References Cited

U.S. PATENT DOCUMENTS

| | | |
|---|---|---|
| 9,354,900 B2 | 5/2016 | Abraham et al. |
| 2007/0157101 A1 | 7/2007 | Indiran et al. |
| 2008/0143685 A1 | 6/2008 | Lee et al. |
| 2008/0215980 A1 | 9/2008 | Lee et al. |
| 2010/0299436 A1* | 11/2010 | Khalid .............. H04M 1/72412 709/226 |
| 2012/0179976 A1 | 7/2012 | Lee et al. |
| 2012/0192100 A1* | 7/2012 | Wang .................... G06F 3/1462 715/781 |
| 2013/0024778 A1 | 1/2013 | Reeves et al. |
| 2015/0040062 A1 | 2/2015 | Hollis et al. |
| 2015/0065091 A1* | 3/2015 | Lee .................... H04L 67/1095 455/411 |
| 2016/0077682 A1 | 3/2016 | Reeves et al. |
| 2016/0364086 A1 | 12/2016 | Poore et al. |

FOREIGN PATENT DOCUMENTS

| | | |
|---|---|---|
| KR | 10-1524572 B1 | 6/2015 |
| KR | 10-2017-0100269 A | 9/2017 |
| WO | 2009/051911 A1 | 4/2009 |
| WO | 2012/148881 A1 | 11/2012 |

OTHER PUBLICATIONS

Extended European Search Report dated Dec. 17, 2020, issued in European Application No. 20189864.0.

\* cited by examiner

ELECTRONIC DEVICE AND METHOD FOR SHARING DATA THEREOF

CROSS-REFERENCE TO RELATED APPLICATION(S)

This application is based on and claims priority under 35 U.S.C. § 119 of a Korean patent application number 10-2019-0095415, filed on Aug. 6, 2019, in the Korean intellectual Property Office, the disclosure of which is incorporated by reference herein in its entirety.

BACKGROUND

1. Field

The disclosure relates to a technology for sharing data. More particularly, the disclosure relates to the technology for sharing data between an electronic device and an external device.

2. Description of Related Art

Nowadays, various types of electronic devices are being developed and supplied. In particular, as well as the desktop personal computer (PC) of the related art, the distribution of mobile devices having various functions such as smartphones, tablet PCs, and wearable devices is expanding. Furthermore, users have recently used various electronic devices together or have recently used various electronic devices in conjunction with one another. Accordingly, the interest in the technology for interlocking and utilizing a plurality of devices has been increased.

The above information is presented as background information only to assist with an understanding of the disclosure. No determination has been made, and no assertion is made, as to whether any of the above might be applicable as prior art with regard to the disclosure.

SUMMARY

It is easy to carry a mobile electronic device, but the area of a display is limited. Accordingly, a technology for displaying a screen associated with a mobile electronic device through the display of an external device connected to the mobile electronic device has been developed. In this case, when the mobile electronic device and the external device use the same type of operating systems, there may be no problem in transmitting or sharing data with each other. However, when the mobile electronic device and the external device use different operating systems, there may be a need for a method of seamlessly transmitting or sharing data with each other.

Aspects of the disclosure are to address at least the above-mentioned problems and/or disadvantages and to provide at least the advantages described below. Accordingly, an aspect of the disclosure is to provide an electronic device capable of seamlessly and easily sharing data when being connected to an external device using a different operating system, and a data sharing method of an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a touch screen display, an input/output interface connected to an external device, a memory, and at least one processor electrically connected to the touch screen display, the input/output interface, and the memory. The at least one processor may be configured to output a screen associated with the electronic device within a window displayed in a first region of a display of the external device based on the electronic device being connected through the input/output interface to the external device using an operating system different from an operating system of the electronic device, output a sub-window corresponding to at least one application stored in the electronic device within the window, determine a target application based on the input based on an input to the sub-window being applied from the external device, set data reception path information based on a feature of the target application to transmit the set data reception path information to the external device, and receive data corresponding to the input from the external device based on the data reception path information.

In accordance with another aspect of the disclosure, a method of data sharing of an electronic device is provided. The method includes outputting a screen associated with the electronic device in a window displayed in a first region of a display of the external device based on the electronic device being connected through an input/output interface to an external device using an operating system different from an operating system of the electronic device, outputting a sub-window corresponding to at least one application stored in the electronic device within the window, determining a target application based on the input based on an input to the sub-window being applied from the external device, setting data reception path information based on a feature of the target application to transmit the set data reception path information to the external device, and receiving data corresponding to the input from the external device based on the data reception path information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
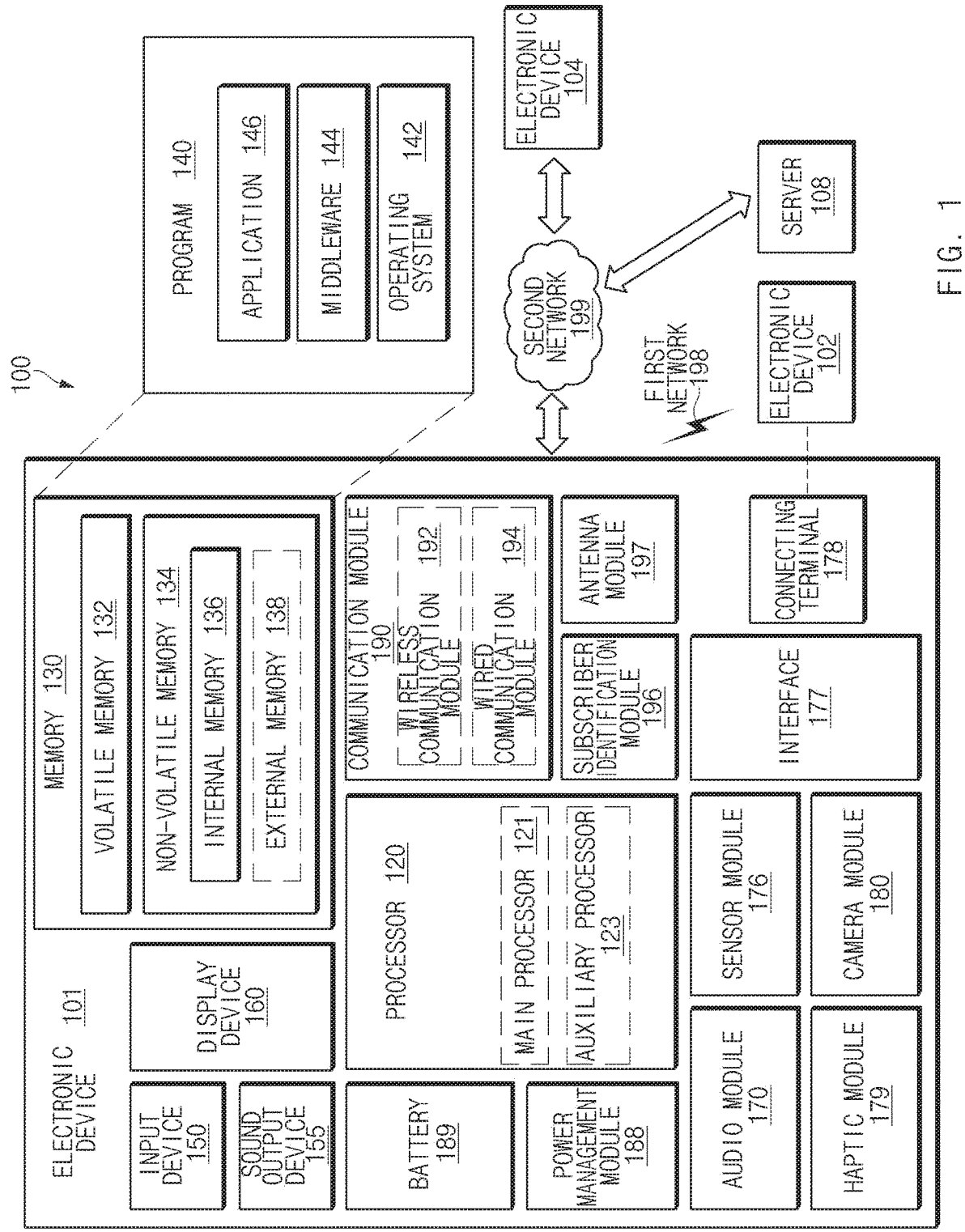
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, fo example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (MST)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
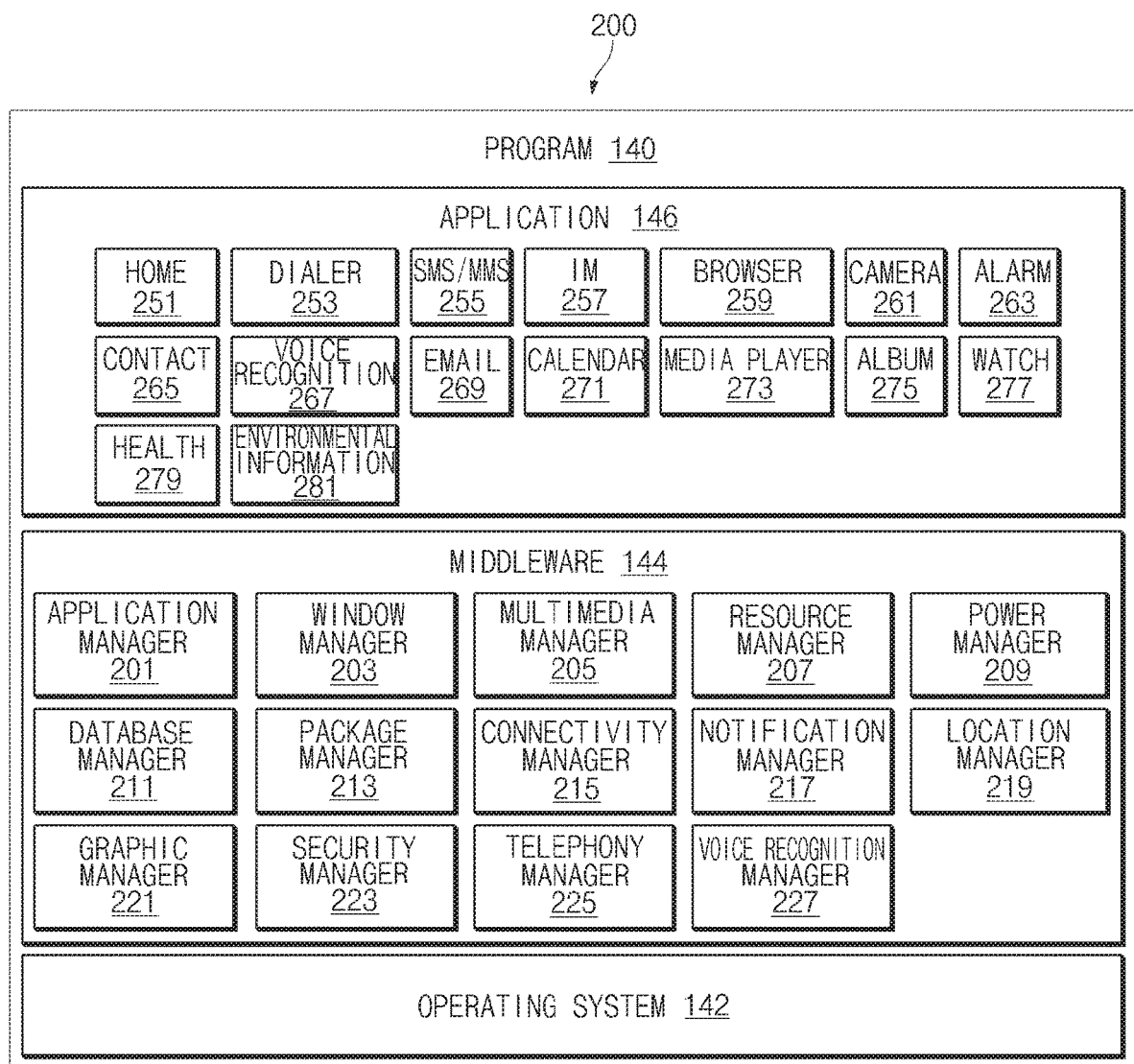
FIG. 2 is a block diagram illustrating the program according to an embodiment of the disclosure.

FIG. 2 is a block diagram 200 illustrating the program 140 according to an embodiment of the disclosure.

Referring to FIG. 2, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface (UI) related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 (shown in FIG. 2) may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
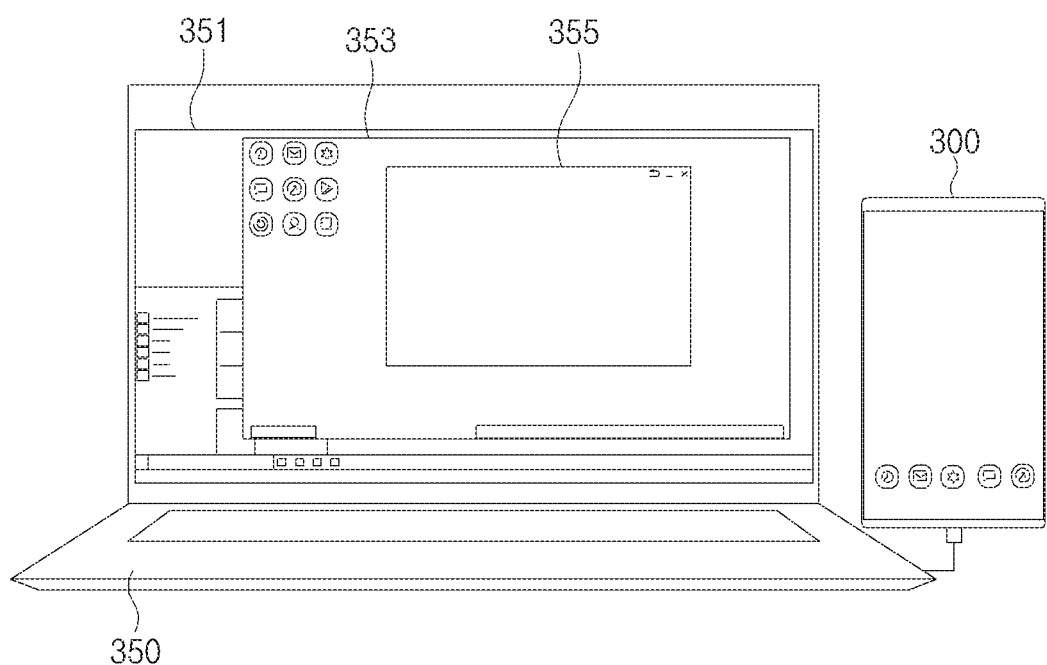
FIG. 3 illustrates an operating environment of an electronic device according to an embodiment of the disclosure.

FIG. 3 illustrates an operating environment of an electronic device according to an embodiment of the disclosure.

Referring to FIG. 3, an electronic device 300 according to an embodiment may be connected to an external device 350. For example, the electronic device 300 may be a mobile device such as a smartphone, a tablet PC, or a wearable device. For example, the external device 350 may be a device (e.g., a notebook or desktop PC and monitor) including a display 351 larger than the electronic device 300. According to an embodiment, the external device 350 may be a device using a different operating system from the operating system of the electronic device 300. For example, the electronic device 300 may include the operating system of Android. For example, the external device 350 may include the Windows operating system.

According to an embodiment, the electronic device 300 may be connected to the external device 350 through an input/output interface (e.g., USB or HIM). According to an embodiment, the electronic device 300 may be connected to the external device 350 through a relay device (not illustrated). For example, the relay device may be a dock (or a docking station). According to an embodiment, the electronic device 300 may be wirelessly connected to the external device 350 through a communication module. Referring to FIG. 3, the electronic device 300 is connected to the external device 350 through an input/output interface (e.g., USB or HDMI cable), but it is not limited thereto. The electronic device 300 may be connected to the external device 350 in various ways.

According to an embodiment, when the electronic device 300 is connected to the external device 350, the electronic device 300 may output a screen through the display 351 of the external device 350. According to an embodiment, the electronic device 300 may output the window 353 associated with the electronic device 300 to at least part of the display 351 of the external device 350. For example, the electronic device 300 may output a sub-window 355 corresponding to at least one application stored in the electronic device 300, in the window 353 associated with the electronic device 300 displayed on the display 351 of the external device 350.

According to an embodiment, the electronic device 300 may reconstruct a screen displayed on the touch screen display of the electronic device 300. For example, the electronic device 300 may reconstruct the screen displayed on the touch screen display into the window 353 to be output on the display 351 of the external device 350. According to an embodiment, the electronic device 300 may organize the sub-window 355 corresponding to the application, based on the features of the application. For example, the electronic device 300 may organize the sub-window 355 having features corresponding to features of the application. According to an embodiment, the electronic device 300 may output the reconstructed screen through the display 351 of the external device 350. For example, the electronic device 300 may reconstruct the screen displayed on the touch screen display into a user interface (UI) or user experience (UX), which is similar to the UI or UX for using a desktop PC, and may output the reconstructed screen through the display 351 of the external device 350. For example, when the external device 350 is a desktop PC, the electronic device 300 may reconstruct the UI or UX having a size, arrangement, or format similar to the UI or UX provided by an operating system (e.g., Windows operating system) of the external device 350 and may output the reconstructed UI or UX through the display 351 of the external device 350 (e.g., a monitor connected to a desktop PC).

According to an embodiment, the electronic device 300 and the external device 350 may operate independently. For example, the touch screen display of the electronic device 300 and the display 351 of the external device 350 may output different types of UIs or UXs. For example, when the electronic device 300 executes the application, the screen of the executed application may be displayed on the touch screen display of the electronic device 300; when the application is executed through the external device 350, a screen (e.g., the sub-window 355 of the executed application may be displayed in at least part (e.g., the window 351) of the display of the external device 350. According to various embodiments, the touch screen display of the electronic device may be turned off depending on user settings or a state (e.g., the battery state of the electronic device 300) of the electronic device 300; at least a partial region (e.g., the window 353) of the display 351 of the external device 350 or an application screen (e.g., the sub-window 355) within at least the partial region may be displayed.

According to an embodiment, the electronic device 300 may be wired or wirelessly connected to an external input device such as a keyboard or mouse. According to an embodiment, the electronic device 300 may receive a user input through the connected external input device. According to an embodiment, when the external device 350 is connected to an external input device such as a keyboard or mouse, the electronic device 300 may receive a user input through the external input device connected to the external device 350. According to an embodiment, the electronic device 300 may receive a user input through a touch screen display of the electronic device 300, or an input device of the external device 350 (e.g., a touch screen display of the external device 350).

Figure 4:
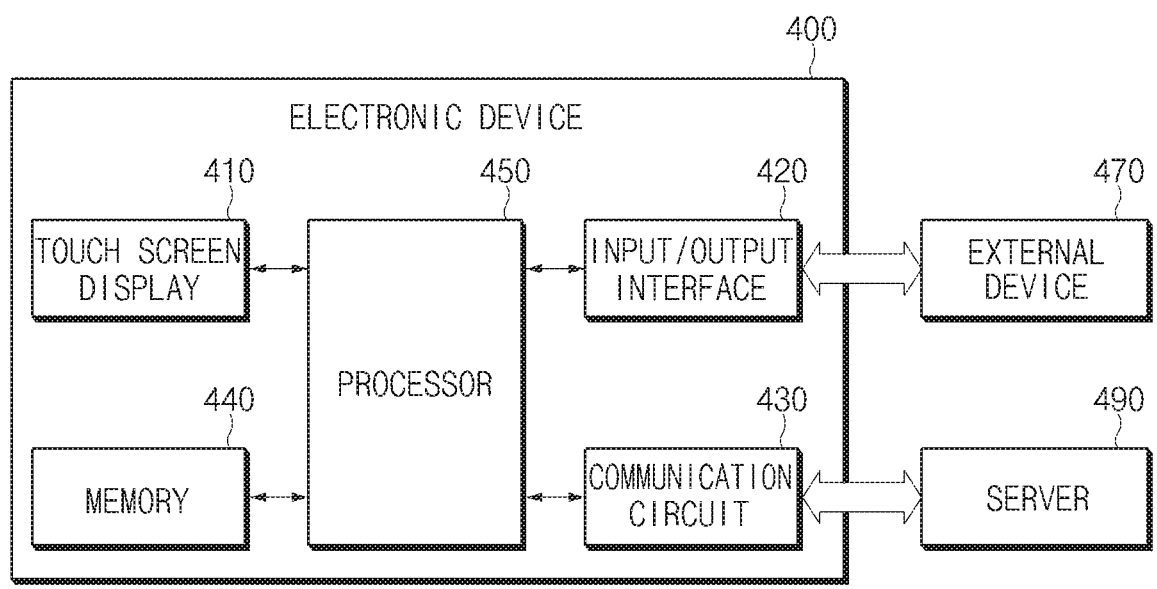
FIG. 4 is a block diagram of the electronic device according to an embodiment of the disclosure.

FIG. 4 is a block diagram of an electronic device 400 according to an embodiment of the disclosure.

Referring to FIG. 4, the electronic device 400 (e.g., the electronic device 101 of FIG. 1) may include a touch screen display 410, an input/output interface 420, a communication circuit 430, a memory 440, and a processor 450.

According to an embodiment, the touch screen display 410 (e.g., the display device 160 of FIG. 1) may detect a touch input and may output a screen. For example, the touch screen display 410 may include a touch panel detecting the touch input and a display panel outputting an image. According to an embodiment, when the electronic device 400 is connected to an external device 470, the touch screen display 410 may not output the screen. According to an embodiment, even when the electronic device 400 is connected to the external device 470, the touch screen display 410 may output a screen or may detect the touch input.

According to an embodiment, the input/output interface 120 (e.g., the interface 177 of FIG. 1) may be connected to the external device 470. For example, the input/output interface 420 may be connected to the external device 470 wirelessly or wired. According to an embodiment, the input/output interface 420 may be connected to the external device 470 through a relay device such as a dock or docking station, or may be connected to the external device 470 through a cable. For example, the input/output interface 420 may include various interfaces such as USB, HDMI, D-subminiature (D-SUB), or optical interface. For example, the input/output interface 420 may include a communication interface capable of wirelessly communicating with the external device 470.

According to an embodiment, the communication circuit 430 (e.g., the communication module 190 of FIG. 1) may communicate with a server 490. For example, the communication circuit 430 may communicate with the server 490, using various communication schemes including long term evolution (LTE) or Wi-Fi. For example, the communication circuit 430 may receive information from the server 490. For example, the communication circuit 430 may receive, from the server 490, a list of applications for supporting the resizing of windows or a list of applications that may not be executed when the electronic device 400 is connected to the external device 470.

According to an embodiment, the memory 440 (e.g., the memory 130 of FIG. 1) may include a volatile and/or nonvolatile memory 440. For example, the memory 440 may store one or more applications. For another example, the memory 440 may include a first launcher (e.g., a normal mode launcher 520) for the touch screen display 410 and a second launcher (e.g., a desktop mode launcher 510) for the external device 470. According to an embodiment, the memory 440 may store an operating system (e.g., an Android operating system) of the electronic device 400 and may store a framework included in the operating system. According to an embodiment, the memory 440 may store at least part of programs (e.g., the program 140 of FIG. 1 or 2 or a program module of the electronic device 500 of FIG. 5).

According to an embodiment, the processor 450 (e.g., the processor 120 in FIG. 1) may be electrically connected to the touch screen display 410, the input/output interface 420, the communication circuit 430, and the memory 440. According to an embodiment, the processor 450 may control the touch screen display 410, the input/output interface 420, the communication circuit 430, and the memory 440.

According to an embodiment, when the electronic device 400 is connected to the external device 470 using an operating system different from the electronic device 400 through the input/output interface 420, the processor 450 may output a screen associated with the electronic device 400 in the window displayed in the first region of the display of the external device 470. For example, the operating system of the electronic device 400 may be Android operating system; the operating system of the external device 470 may be Windows operating system. According to an embodiment, when the electronic device 400 is connected to the external device 470, the processor 450 may request or control the external device 470 to output a window to one region of the display of the external device 470. For example, the processor 450 may output the screen associated with the electronic device 400, in the window that the external device 470 (e.g., the operating system of the external device 470) outputs to one region of the display of the external device 470.

According to an embodiment, the electronic device 400 may organize a screen displayed on the touch screen display 410 of the electronic device 400 or a screen corresponding to at least one application stored in the electronic device and may output the organized screen in the window displayed in the first region of the display of the external device 470. For example, when the electronic device 100 and the external device 470 are connected to each other, the external device 470 (e.g., the operating system of the external device 470) may output a window to at least a partial region (e.g., the first region) of the display of the external device 470. For example, the electronic device 400 may output the screen associated with the electronic device 400 in the window displayed in the first region of the display of the external device 470. According to an embodiment, when the electronic device 400 is connected to the external device 470, the electronic device 400 may change screen configuration information associated with at least part of the resolution, density, or orientation of the screen associated with the electronic device 400. For example, the electronic device 400 may output the screen associated with the electronic device 400 in the window of the first region, based on the changed screen configuration information. According to various embodiments, the touch screen display 410 of the electronic device 400 and the screen output in the window of the first region may be independent of each other. For example, the screen associated with applications the same as one another may be output to the touch screen display 410 of the electronic device 400 and the first region of the external device 470; alternatively, the screen associated with applications different from one another may be output to the touch screen display 410 and the first region of the external device 470. For example, a screen corresponding to an email application of the electronic device 400 may be displayed on the touch screen display 410; a screen corresponding to a file management application of the electronic device 400 may be displayed in the window of the first region. According to an embodiment, after the electronic device 400 is connected to the external device 470, the touch screen display 410 of the electronic device 400 may be turned off based on user inputs or settings.

According to an embodiment, the electronic device 400 may display the screen associated with the external device 470, in the second region other than the first region in the display of the external device 470. For example, the processor 450 may control the screen configured by the operating system of the electronic device 400 to be output in the first region (window) of the display of the external device 470, and may control the screen configured by the operating system of the external device 470 to be output in the second region.

According to an embodiment, the processor 450 may output a sub-window corresponding to at least one application stored in the electronic device 400, in a window. For example, the electronic device 400 may output a sub-window corresponding to at least one respective application being executed in the electronic device 400, in the window of the first region, According to an embodiment, when the electronic device 400 is connected to the external device 470, the electronic device 400 may organize the sub-window corresponding to the application, based on the changed screen configuration information and may output the organized sub-window in the first region. For example, the processor 450 may display data (e.g., a file, a text, an image, or hypertext markup language (HTML)) associated with the corresponding application, in the sub-window.

According to an embodiment, when an input to the sub-window is applied from the external device 470, the processor 450 may determine a target application, based on the applied input. For example, the input to the sub-window may include a drag input from a second region through the external device 470 (e.g., an input device (e.g., a touch panel, a touch screen display, a keyboard, or the like) of an external device 470 or an input device (e.g., a mouse, a keyboard, a touch pad, a touch screen display, or the like) connected to the external device 470) to a point in the sub-window. For example, when a drag input to move specific data (e.g., a file) displayed in the second region from the external device 470 into the sub-window is applied, the processor 450 may determine that an application corresponding to the sub-window is a target application.

According to an embodiment, the processor 450 may set data reception path information based on the features of the target application and may transmit the data reception path information to the external device 470. For example, the processor 450 may identify the features of a target application. For example, the features of the application may include information about whether the application supports data migration or whether the application supports data attachment. For example, a file management application (e.g., My Files), a gallery application, or an interlocking application (e.g., Dex) may support the data migration. For example, a message application, an email application, and a memo application may support the file attachment. The above-mentioned applications are not limited thereto as an example, and various applications may support the data migration or file attachment.

According to an embodiment, the processor 450 may set data reception path information based on the attribute of an application. For example, when the target application is an application supporting the data attachment, the processor 450 may recognize a storage path for a location where the attached data is stored. For example, in the Android operating system, the processor 450 may recognize a storage path for a hidden folder in which attached data is stored. For example, an application supporting data attachment may attach data stored in the hidden folder. According to an embodiment, the processor 450 may set the data reception path information based on the recognized storage path and transmit the data reception path information to the external device 470.

According to an embodiment, the processor 450 may receive path information of data corresponding to an input to the sub-window from the external device 470, and may determine whether the data corresponding to the input is capable of being applied to the target application, based on the received path information of the data. For example, the processor 450 may determine whether the corresponding data is capable of being applied to the target application, based on information associated with the data received from the external device 470. According to an embodiment, when the data corresponding to the input is incapable of being supported or applied in the target application, the processor 450 may provide a notification thereof through the display of the external device 470.

According to an embodiment, the processor 450 may receive data corresponding to the input from the external device 470 based on the data reception path information. According to an embodiment, the processor 450 may temporarily store the data received through the set data reception path in the memory 440.

According to an embodiment, when a drag input from the first region to the second region is applied from the external device 470, the processor 450 may transmit path information of data corresponding to the drag input to the external device 470, According to an embodiment, the processor 450 may transmit information corresponding to the input to the external device 470 such that the external device 470 using a different operating system is capable of processing consecutive drag inputs. For example, when the drag input is out of the window boundary of the first region, the processor 450 may interrupt the input processing mechanism under the operating system of the electronic device 400 and may provide information associated with the input to the external device 470 to allow the external device 470 to continuously process inputs under the operating system of the external device 470. According to an embodiment, the processor 450 may allow consecutive inputs between the first region (e.g., a window or sub-window) associated with the electronic device 400 displayed on the display of the external device 470 and the second region associated with the external device 470 to be processed seamlessly.

According to an embodiment, when an input to the window is applied from the external device 470, the processor 450 may determine whether there is clip data copied from the external device 470. For example, when an input for selecting or focusing a window of the first region is applied from the external device 470, the electronic device 400 may determine whether there is clip data copied in the clipboard of the external device 470. According to an embodiment, when an input for selecting or focusing the window of the first region is applied from the external device 470, the processor 450 may receive path information about clip data copied from the external device 470. According to an embodiment, the processor 450 may provide the clipboard of the electronic device 400 with information associated with the copied clip data, based on path information about the copied clip data. According to an embodiment, the clipboard of the electronic device 400 may be a partial storage region of the memory 440 set to be used upon copying or pasting data. According to an embodiment, the clipboard may store a piece or pieces of data. According to an embodiment, even when the electronic device 400 is powered off without performing a storage operation according to a separate user input, the data stored in the clipboard may be maintained without being deleted. For example, the information associated with the copied clip data may be path information (e.g., file uniform resource identifier (URI)) of data. For example, the file URI may fail to provide intuitive information to the user. According to an embodiment, the processor 450 may display a UI (e.g., a folder icon) intuitively indicating that there is clip data copied from the external device 470 in the clipboard of the electronic device 400.

According to an embodiment, in the case where the copied data is present in the clipboard of the electronic device 400, when an input to the second region is applied from external device 470, the processor 450 may transmit, to the external device 470, at least part of data copied in the clipboard of the electronic device 400. For example, in the case where the data copied in the clipboard of the electronic device 400 is present, when an input for selecting or focusing the second region is applied from the external device 470, the processor 450 may transmit, to the external device 470, at least part (e.g., the most recently copied data) of data copied in the clipboard of the electronic device 400. For example, the electronic device 400 may allow the external device 470 to set the transmitted data as the clip data of the external device 470. According to an embodiment, in the case where the copied data is present in the clipboard of the electronic device 400, when an input to the second region is applied from external device 470, the processor 450 may convert information about at least part of data copied in the clipboard of the electronic device 400 into a format capable of being utilized in the operating system of the external device 470. For example, the processor 450 may transmit information about the converted data to the external device 470.

According to an embodiment, after an input to the window is applied from the external device 470, an input to the sub-window may be additionally applied. For example, after an input for focusing a window is applied from the external device 470, an input for pasting clip data stored in the clipboard of the external device 470 in a specific sub-window may be applied. According to an embodiment, when an input for pasting clip data in the sub-window is applied, the processor 450 may determine a target application corresponding to the sub-window and may set data reception path information based on the features of the target application to transmit the data reception path information to the external device 470. According to an embodiment, the processor 450 may receive clip data from the external device 470 based on the data reception path information.

According to various embodiments of the disclosure, when being connected to an external device using a different operating system, the electronic device 400 (e.g., the processor 450) may smoothly process consecutive inputs under different operating systems, and may provide a method for efficiently transmitting and sharing data between devices using different operating systems.

Figure 5:
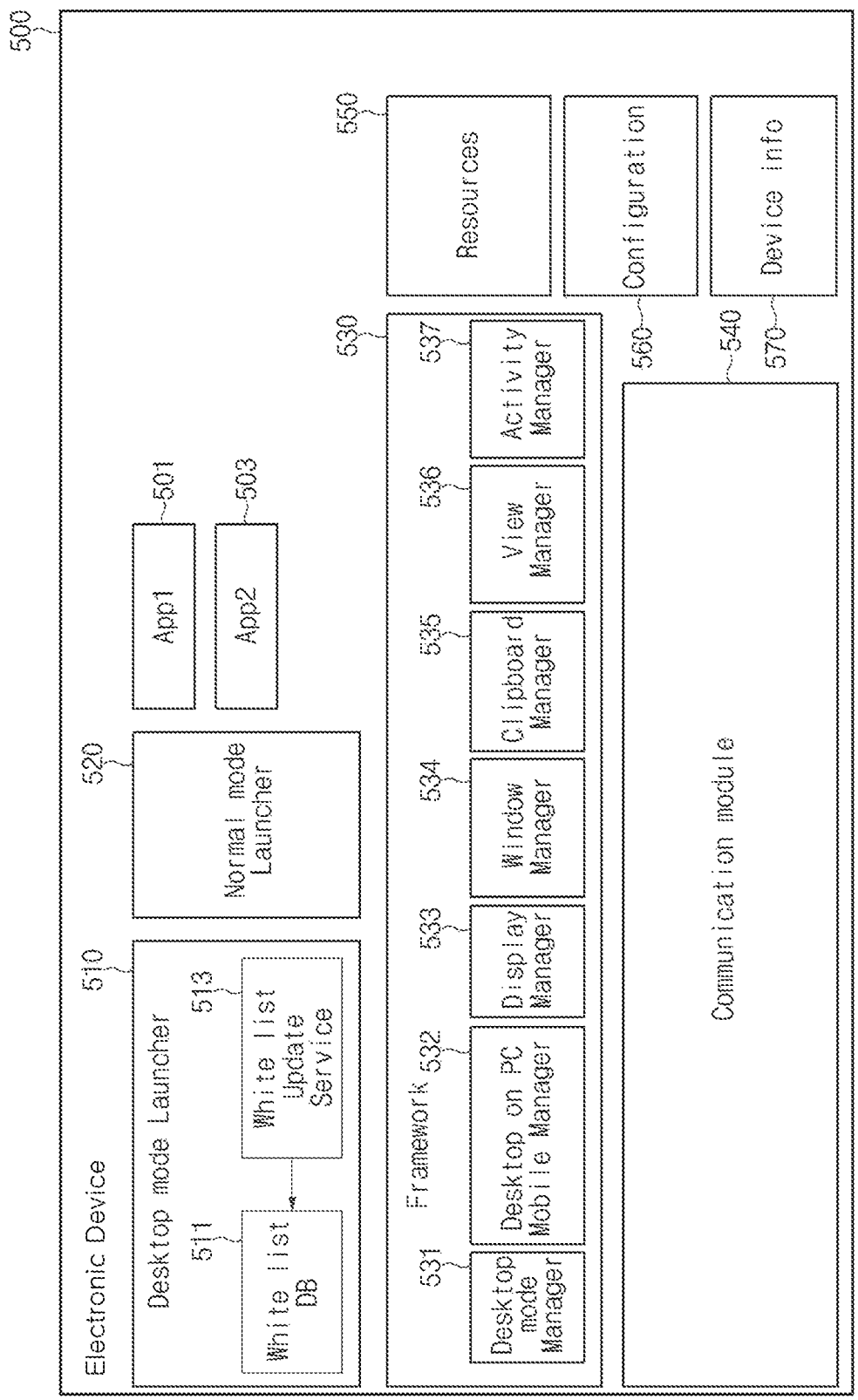
FIG. 5 is a block diagram illustrating a program module of an electronic device according to an embodiment of the disclosure.

FIG. 5 is a block diagram illustrating a program module of an electronic device 500 according to an embodiment of the disclosure.

Referring to FIG. 5, the electronic device 500 (e.g., the electronic device 101 of FIG. 1 or the electronic device 400 of FIG. 4) may store at least one program. For example, the electronic device 500 may include a first application App1 501, a second application App2 503, the desktop mode launcher 510; and the normal mode launcher 520, and a framework 530. According to an embodiment, the electronic device 500 may store at least one data. For example, the electronic device 500 may store resources 550, a configuration 560, and device info 570.

According to an embodiment, the electronic device 500 may include a communication module 540. According to an embodiment, the program or data illustrated in FIG. 5 may be stored in a memory (e.g., the memory 130 of FIG. 1 or the memory 440 of FIG. 4), and may be executed or used by the processor (e.g., the processor 120 of FIG. 1 or the processor 450 of FIG. 4). According to various embodiments, the program or data stored by the electronic device 500 may include at least part of the program 140 of FIG. 1 or 2, According to various embodiments, the program or data stored by the electronic device is not limited to that illustrated in FIG. 5; programs or data necessary to perform embodiments disclosed in this specification may be further included, or some programs or data may be omitted.

According to an embodiment, the electronic device 500 may store a plurality of applications. An embodiment is exemplified FIG. 5 as the electronic device 500 stores two applications App1 501 and App2 503. However, the embodiment is not limited thereto. For example, the electronic device 500 may store applications of the arbitrary number. According to an embodiment, each application (e.g., the first application App1 501 or the second application App2 503) may include at least one activity. According to various embodiments, the activity may require only the screen of landscape, may require only the screen of portrait, or the screens of landscape and portrait, depending on how the screen is organized. According to an embodiment, when the electronic device 500 is connected to an external device, the activity may be output on the organized screen, based on the resolution of the display of the external device.

According to an embodiment, the desktop mode launcher 510 may be executed when the electronic device 500 is connected to the external device. According to an embodiment, when the electronic device 500 is connected to the external device, the desktop mode launcher 510 may provide an introduction to a desktop mode and may provide an option of executing the desktop mode or a mirroring connection option. For example, when the electronic device 500 and the external device are connected to each other, the desktop mode may be a mode in which a screen associated with an electronic device may be output to at least a partial region of the display of the external device. For example, the introduction to a desktop mode may include a description about a desktop mode, a desktop mode executing method (how to use a desktop mode), a function to provide a desktop mode, information about a program or application necessary to execute a desktop mode, and/or information about an installation method. According to an embodiment, the desktop mode launcher 510 may provide the UI or UX similar to that of the desktop displayed on the external device. According to an embodiment, the desktop mode launcher 510 may support the resizing of a resizable window or sub-window.

According to an embodiment, the desktop mode launcher 510 may include a white list update service 513 and a white list database (DB) 511. For example, the white list update service 513 may be a program for managing a white list, and the white list DB 511 may include the white list and related data. The white list update service 513 may obtain the white list, which is a list of applications supporting resizing, from the server. For example, the white list update service 513 may determine whether the white list is updated in the server at a specified period, using an alarm service after the desktop mode launcher 510 is executed. The white list update service 513 may obtain the URI of the white list file, using the application programming interface (API) provided by the content cloud server and may download the white list file. According to an embodiment, the white list DB 511 may store the name of an application supporting resizing and/or the name of a package. According to various embodiments, the white list DB 511 may store the name of an application, which supports resizing, from among applications installed in the electronic device 500 and/or the name of a package.

According to an embodiment, the normal mode launcher 520 may be executed when the electronic device 500 is not connected to the external device. According to an embodiment, the normal mode launcher 520 may provide the UI or UX such as a home screen displayed on a touch screen display. According to an embodiment, even when the electronic device 500 is connected to an external device, the normal mode launcher 520 may provide the UI or UX displayed on the touch screen display of the electronic device 500. According to an embodiment, when the electronic device 500 is connected to the external device, the desktop mode launcher 510 may provide a screen displayed on the display of the external device, and the normal mode launcher 520 may not provide a screen displayed on the touch screen display of the electronic device 500. For example, when the electronic device 500 is connected to the external device, the display of the external device may provide a screen associated with the electronic device 500 and the touch screen display of the electronic device 500 may be turned off. According to an embodiment, when both the electronic device 500 and the external device are used, the normal mode launcher 520 may provide a screen displayed on the touch screen display of the electronic device 500, and the desktop mode launcher 510 may provide a screen displayed on the display of the external device. For example, in a dual mode where both the electronic device 500 and the external device are used, the normal mode launcher 520 and the desktop mode launcher 510 may independently provide a screen displayed on the touch screen display of the electronic device 500 and a screen displayed on the display of the external device, respectively.

According to an embodiment, the framework 530 may include a desktop mode manager 531, a desktop on PC (DoP) mobile manager 532, a display manager 533, a window manager 534, a clipboard manager 535, a view manager 536, and an activity manager 537.

When the application is executed, the desktop mode manager 531 may obtain information associated with the resizing of the executed application. For example, the desktop mode manager 531 may obtain information about information associated with the manifest of an application, whether an application corresponds to a preloaded application, whether an application is included in a white list, or the like. According to an embodiment, when the application is executed, the desktop mode manager 531 may bring exception for each application. For example, the exception may include at least one of information about whether an application is executed in a compatibility mode (e.g., a static window) or a freeform window upon executing the application, whether to support a screen orientation, or whether to support resizing.

According to an embodiment, when receiving a user input through an input device (e.g., a mouse, a keyboard, or a touch panel (touch screen display)), the DoP mobile manager 532 may transmit information (e.g., coordinate information) corresponding to the user input to the external device. According to an embodiment, the external device may include a DoP PC manager corresponding to the DoP mobile manager 532. For example, the DoP mobile manager 532 may deliver the event of each application being executed by the electronic device 500, to an external device (e.g., the DoP PC manager). For example, the DoP PC manager of the external device may deliver event information generated from the external device to the electronic device 500 (e.g., the DoP mobile manager 532), According to an embodiment, when the external device is connected to the electronic device 500 through an input/output interface (e.g., USB or HDMI) for the first time, the DoP mobile manager 532 may install a driver in the external device. For example, when the external device is connected, the DoP mobile manager 532 may provide an introduction to the desktop mode and a guide for installing a DoP PC program (e.g., a DoP PC manager) to execute a desktop mode. According to an embodiment, when an input associated with a window or sub-window output to the display of the external device is input from the external device, the DoP mobile manager 532 may pectoral a function to transmit or share data in conjunction with the DoP PC manager of the external device. For example, when a user input is moved between the window associated with the electronic device 500 displayed on the display of the external device and the screen associated with the external device, the DoP mobile manager 532 and the DoP PC manager may provide information to each other to process the user input. According to an embodiment, the DoP PC manager may support the connection between the electronic device 500 and the external device, and may perform window frames output to the external device, the migration of data (e.g., a folder, a file, a text, or HTML), and a function Input control or sync control) to process the user input.

According to an embodiment, the display manager 533 may organize or control the screen displayed on the touch screen display of the electronic device 500 and/or the display of the external device. For example, the display manager 533 may organize a screen to be output to a sub-window generated by the window manager 534, and may output a screen associated with an electronic device in a window or sub-window.

According to an embodiment, the window manager 534 may change the configuration 560. The window manager 534 may generate a sub-window based on the changed configuration 560. For example, when the configuration 560 is changed, the window manager 534 may generate an event of changing the configuration 560 and may generate a window or sub-window based on the changed configuration 560. The window manager 534 may display an icon for providing a function such as 'back', 'minimize', 'maximize', and/or 'close', in the top header of the window or the sub-window. For example, because an application (e.g., an application supporting portrait only) that does not support a specific orientation (e.g., landscape) depending on the features of the application doesn't provide a function of rotation and maximization, some of the icons may be omitted from the top header of the window or sub-window, According to various embodiments, the window manager 534 may simultaneously generate a plurality of windows sub-windows and may provide a multi-instance function. For example, the minimum size of a sub-window may be set to a size at which the most basic usability of an application is guaranteed. For example, the maximum size of the window (the sub-window) may be the size of the whole region of the display of the external device. According to an embodiment, when the window is terminated (removed) from the display of the external device, the window manager 534 may cause the application to be completely killed (process kill) on a memory without being executed in background. According to an embodiment, when the size of the window is smaller than the region of the content displayed in the window, the window manager 534 may provide a scroll bar to the window, According to an embodiment, when the capacity of the available memory is smaller than the set amount upon outputting multiple windows, the electronic device 500 (e.g., the window manager 534) may cause a warning screen to be output to the touch screen display of the electronic device 500 or the display of an external device.

According to an embodiment, the clipboard manager 535 may support copy and paste functions. For example, when performing a copy function depending on a user input, the clipboard manager 535 may store data selected by the user input in the form of clip data. For example, when performing a paste function depending on a user input, the clipboard manager 535 may return and provide the most recently stored clip data. According to an embodiment, the clipboard manager 535 may provide a UI or UX for providing the stored at least one clip data. For example, the clipboard manager 535 may allow a user to select specific clip data, by outputting information of stored clip data.

According to an embodiment, when data (e.g., a file) is moved by a user input (e.g., drag and drop), the view manager 536 may provide file description or URI information.

According to an embodiment, when the configuration 560 is changed, the activity manager 537 may obtain the changed configuration 560 from the window manager 534. The activity manager 537 may allow the manager of the resource 550 to update the resource 550 based on the changed configuration 560. The activity manager 537 may allow an application or the activity included in the application to construct a screen based on the changed configuration 560.

According to an embodiment, the resource 550 may include the resource 550 of the activity included in the application. For example, the activity resource 550 may include information about the image or layout included in the execution screen of the activity being changed, based on the configuration 560.

According to an embodiment, the configuration 560 may include the resolution (e.g., dpi or density) of a screen generated by the electronic device 500, the orientation (portrait or landscape) of the screen, size information (e.g., width or height) of the screen, the execution screen size of an application, and the like. According to an embodiment, the configuration 560 may correspond to each activity included in the application.

According to an embodiment, the device info 570 may include information about the physical size (e.g., width and height) of the electronic device 500 (e.g., a touch screen display or a display). For example, the device info 570 may include information about logical width or logical height.

According to an embodiment, to prevent layout errors or touch errors on a screen (window) displayed on the display of the external device, the electronic device 500 may adjust the configuration 560 or the device info 570 with respect to an application operating in a compatibility mode.

According to an embodiment, the communication module 540 (e.g., the communication module 190 of FIG. 1 or the communication circuit 430 of FIG. 4) may communicate with a server. For example, the communication module 540 may receive a list of applications (e.g., white list) that support the resizing of a window from the server; alternatively, the communication module 540 may receive a list of applications (e.g., black list) incapable of being executed when the electronic device is connected to the external device.

According to an embodiment, an electronic device (e.g., the electronic device 101 of FIG. 1, the electronic device 400 of FIG. 4, or the electronic device 500 of FIG. 5) may include a touch screen display (e.g., the display device 160 of FIG. 1), an input/output interface (e.g., the interface 177 of FIG. 1) connected to an external device, a memory (e.g., the memory 130 of FIG. 1 or the memory 440 of FIG. 4), and a processor (e.g., the processor 120 of FIG. 1 or the processor 450 of FIG. 4) electrically connected to the touch screen display, the input/output interface, and the memory.

According to an embodiment, the processor may be configured to output a screen associated with the electronic device within a window displayed in a first region of a display of the external device when the electronic device is connected through the input/output interface to the external device using an operating system different from an operating system of the electronic device, to output a sub-window corresponding to at least one application stored in the electronic device within the window, to determine a target application based on the input when an input to the sub-window is applied from the external device, to set data reception path information based on a feature of the target application to transmit the set data reception path information to the external device, and to receive data corresponding to the input from the external device based on the data reception path information.

According to an embodiment, the processor may be configured to display a screen associated with the external device in a second region other than the first region in the display of the external device.

According to an embodiment, the input to the sub-window may include a drag input from the second region to one point within the sub-window.

According to an embodiment, the processor may be configured to receive path information about clip data copied in the external device when an input to the window is applied from the external device.

According to an embodiment, the input to the window may include an input for selecting or focusing the window.

According to an embodiment, the processor may be configured to provide information associated with the copied clip data to a clipboard of the electronic device based on the path information about the copied clip data.

According to an embodiment, the processor may be configured to change screen configuration information associated with at least part of a resolution, density, or orientation of a screen output by the electronic device when the electronic device is connected to the external device, to organize the sub-window corresponding to the at least one application based on the changed screen configuration information, and to cause the external device to display the sub-window in the first region.

According to an embodiment, the processor may be configured to transmit at least part of data copied in a clipboard of the electronic device, to the external device when an input to the second region is applied from the external device, and to set the at least part of the copied data as clip data of the external device.

According to an embodiment, the processor may be configured to transmit path information of data corresponding to the drag input, to the external device when a drag input from the first region to the second region is applied from the external device.

According to an embodiment, the processor may be configured to receive path information of data corresponding to the input from the external device when the input to the sub-window is applied from the external device, and to determine whether data corresponding to the input is applicable to the target application, based on the path information of the data.

Figure 6A:
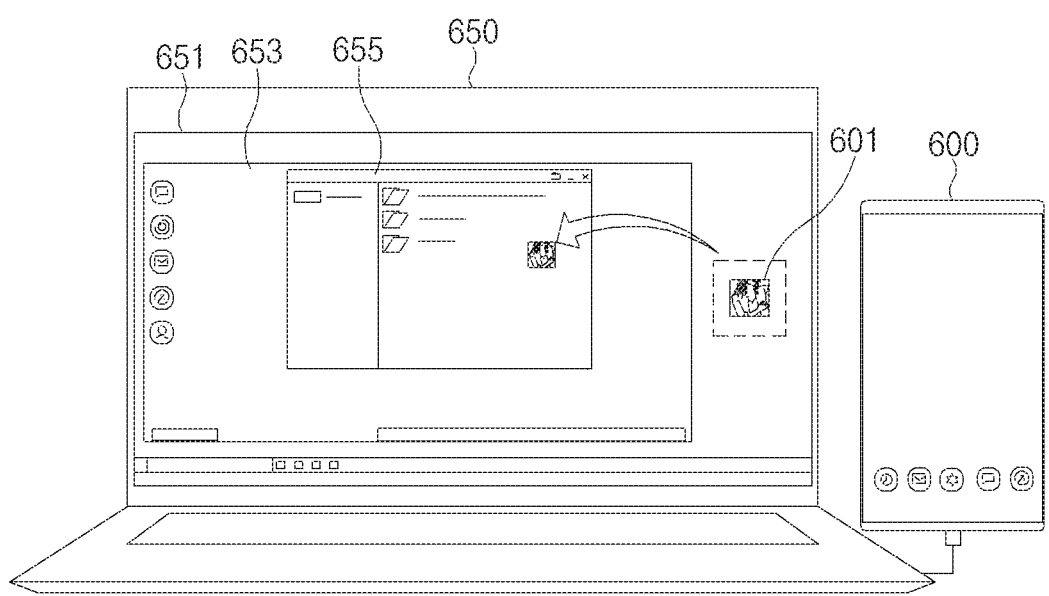
FIGS. 6A and 6B illustrate data sharing operations of an electronic device according to various embodiments of the disclosure.
Figure 6B:
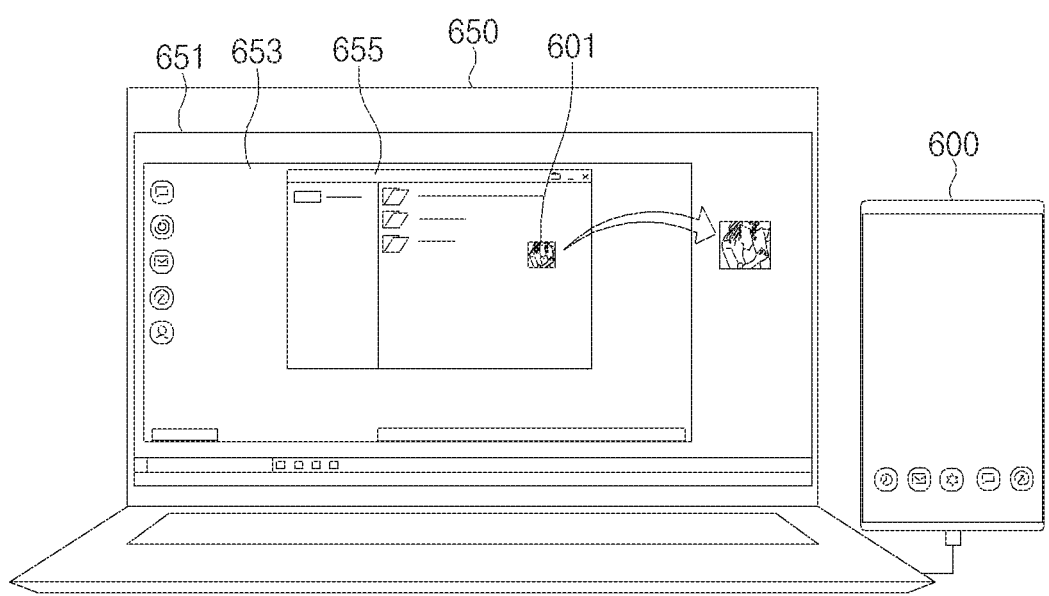

FIGS. 6A and 6B illustrate data sharing operations of an electronic device 600 (e.g., the electronic device 101 of FIG. 1, the electronic device 400 of FIG. 4, and the electronic device 500 of FIG. 5) according to various embodiments of the disclosure.

For example, FIG. 6A illustrates that data displayed on the screen associated with an external device 650 is dragged and dropped to a sub-window 655 associated with the electronic device 600; FIG. 6B illustrates that data displayed on the sub-window 655 is dragged and dropped on a screen associated with the electronic device 600.

According to an embodiment, the electronic device 600 may be connected to the external device 650. For example, the electronic device 600 may be connected wiredly to the external device 650 through an input/output interface (e.g., HDMI or USB), or may be connected wirelessly to the external device 650 through a communication interface. For example, the electronic device 600 may be connected to the external device 650 through a relay device (e.g., dock). According to an embodiment, the external device 650 may be a device using an operating system (e.g., Windows operating system) different from the operating system (e.g., Android operating system) of the electronic device 600.

According to an embodiment, when the electronic device 600 is connected to the external device 650, the electronic device 600 may output a window 653 associated with the electronic device 600 to the first region of a display 651 of the external device 650. For example, the electronic device 600 may reconstruct the screen displayed on the touch screen display to be suitable for the display 651 of the external device 650, and may display the reconstructed screen in the window 653 within the display 651 of the external device 650. For example, the window 653 output on the display 651 of the external device 650 may display a screen corresponding to the home screen of the electronic device 600. According to an embodiment, the electronic device 600 may allow the screen associated with the external device 650 to be displayed in a second region other than the first region within the display 651 of the external device 650. For example, the wallpapers or home screen of the external device 650 may be displayed in the second region in the display 651 of the external device 650. For example, when the external device 650 uses a Windows operating system, the execution screen of the Windows operating system may be displayed in the second region. According to an embodiment, when the electronic device 600 is connected to the external device 650 using an operating system different from that of the electronic device 600, a screen associated with the electronic device 600 based on the operating system of the electronic device 600 and a screen associated with the external device 650 based on the operating system of the external device 650 may be output to the display 651 of the external device 650 together.

According to an embodiment, the electronic device 600 may Output the sub-window 655 corresponding to at least one application stored in the electronic device 600 in the window 653. For example, the electronic device 600 may output the sub-window 655 corresponding to an application being executed by the electronic device 600, For example, the electronic device 600 may display an object 601 corresponding to data (e.g., file) used in a specific application, in the sub-window 655.

According to an embodiment, when the input to the sub-window 655 is applied from the external electronic device 650, the electronic device 600 may determine a target application based on the input. For example, the electronic device 600 may receive an input to the sub-window 655 through the external electronic device 650 or an input device (e.g., a mouse, a keyboard, or the like) connected to the external electronic device 650.

Referring to FIG. 6A, when a drag and drop input is applied to move the object 601 (e.g., file) in the second region associated with the external device 650 into the sub-window 655, the electronic device 600 may recognize an application corresponding to the sub-window 655 to which the corresponding input is applied. For example, the electronic device 600 may determine that an application corresponding to an input-applied sub-window 655 is the target application.

According to an embodiment, the electronic device 600 may set data reception path information based on the features of the target application. For example, the electronic device 600 may recognize a path through which the target application is stored in the electronic device 600. For example, the electronic device 600 may recognize a path through which data associated with the target application is stored. For example, when the target application is an application supporting data copying (migration), the electronic device 600 may recognize a storage path for a location (e.g., folder) where the drop has occurred. For example, when the target application is an application supporting the data attachment, the electronic device 600 may recognize a storage path for a location where the attached data is stored. For example, in the Android operating system, the electronic device 600 may recognize a storage path for a hidden folder in which attached data is stored. For example, an application supporting data attachment may attach data stored in the hidden folder. According to an embodiment, the electronic device 600 may set the data reception path information based on the recognized storage path and transmit the data reception path information to the external device 650.

According to an embodiment, the electronic device 600 may receive data corresponding to the applied input from the external device 650 based on the data reception path information. For example, the electronic device 600 may receive data corresponding to the object 601 moved by a drag and drop input from the external device 650 and may store the received data at a location according to the data reception path information.

Referring to FIG. 6B, when the drag and drop input to move the object 601 (e.g., a file) within the sub-window 655 to the second region associated with the external device 650 is applied, the electronic device 600 may determine that an application corresponding to the input-applied sub-window 655 is the target application.

According to an embodiment, when a drag input crosses the boundary of the window 653 associated with the electronic device 600 and then leads to the second region associated with the external device 650, the electronic device 600 may stop (cancel) the drag input under the operating system of the electronic device 600 and may transmit, to the external device 650, coordinate information about the drag input or information about the dragged object 601. For example, the external device 650 may perform the drag input in the second region, based on information received from the electronic device 600. According to an embodiment, when consecutive inputs occur between the window 653 and the second region, the electronic device 600 and the external device 650 may transmit information about the inputs to seamlessly perform the consecutive inputs even under different operating systems.

According to an embodiment, the electronic device 600 may transmit, to the external device 650; data or a data storage path corresponding to the object 601 moved by the drag and drop input.

Hereinafter, various embodiments of a specific data sharing operation between the electronic device 600 and the external device 650 will be described with reference to FIGS. 7 to 10.

Figure 7:
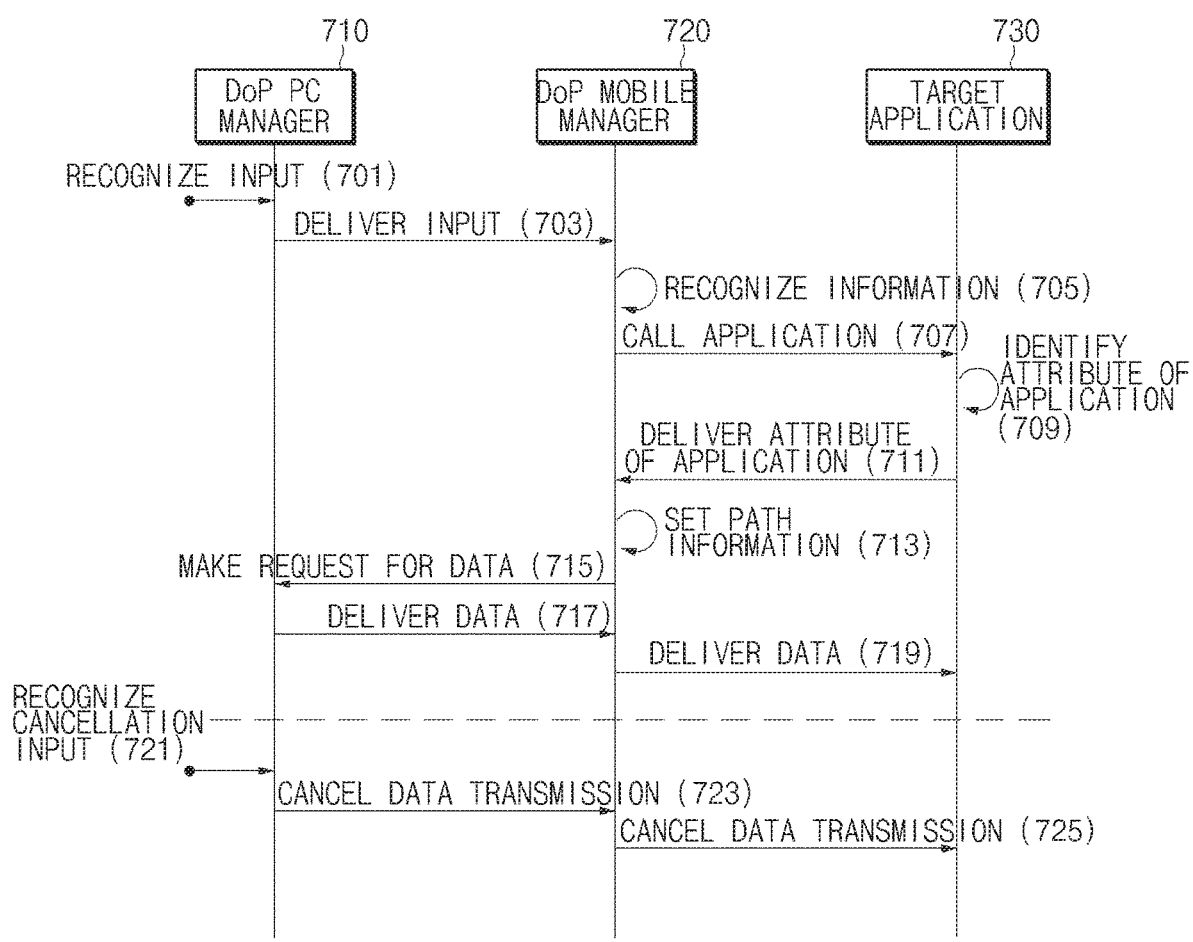
FIG. 7 is a flowchart of a data sharing operation of an electronic device according to an embodiment of the disclosure.

FIG. 7 illustrates a flowchart of a data sharing operation of an electronic device (e.g., the electronic device 101 of FIG. 1, the electronic device 400 of FIG. 4, and the electronic device 500 of FIG. 5) according to an embodiment of the disclosure.

For example, as illustrated in FIG. 6A, FIG. 7 shows operations in the case where data is moved from a screen associated with an external device to a screen (window) associated with an electronic device while the electronic device is connected to the external device.

According to an embodiment, the electronic device may be connected to the external device.

Referring to FIG. 7, according to an embodiment, the electronic device may include a DoP mobile manager 720 and at least one application (e.g., a target application 730); the external device may include a DoP PC manager 710. According to an embodiment, the operating system e.g., Android operating system) of the electronic device may be different from that of the external device (e.g., Windows operating system). According to an embodiment, when the electronic device is connected to the external device, the electronic device may display a screen associated with the electronic device in a window displayed in the first region of the display of the external device and may output a sub-window corresponding to at least one application stored in the electronic device, in a window. For example, when the electronic device is connected to the external device, the external device may output (display) a window in the first region of the display of the external device, and the electronic device may output a screen associated with the electronic device in the window of the first region. According to an embodiment, when the electronic device is connected to the external device, the electronic device may request or control the external device to output a window to a region of the display of the external device. For example, the storage space (e.g., a folder) or data (e.g., a file) associated with an application may be displayed in a sub-window. According to an embodiment, a screen associated with the external device (e.g., the screen of the Windows operating system) may be Output to the second region excluding the first region of the display of the external device. According to an embodiment, the screen displayed in the window or sub-window of the first region may be managed by the DoP mobile manager 720 of the electronic device; the screen output to the second region may be managed by the operating system (e.g., Windows operating system) of the external device. For example, the DoP mobile manager 720 may organize or control a screen (e.g., UI or UX) associated with the electronic device output in a window of the first region by operating in connection with the DoP PC manager 710 of the external device.

According to an embodiment, in operation 701, the DoP PC manager 710 may recognize a drag input. For example, the DoP PC manager 710 may recognize an input that drags an object (e.g., a file) in the second region of the display and drops the object in a window or sub-window of the first region. For example, it may be determined that an application corresponding to the input-dropped sub-window is the target application.

According to an embodiment, in operation 703, the DoP PC manager 710 may deliver, to the DoP mobile manager 720, information indicating that the drop of data (e.g., file) has occurred in a window or sub-window managed by the DoP mobile manager 720. For example, the DoP PC manager 710 may deliver, to the DoP mobile manager 720, at least part of input event information, data information, and related ID information (e.g., transmission ID (txid) or drop ID (dropid)).

According to an embodiment, in operation 705, the DoP mobile manager 720 may recognize and store information necessary for data (file) transmission based on the received information. According to an embodiment, the DoP mobile manager 720 may generate a dummy view to process an input event in the operating system of the electronic device. For example, the dummy view may not actually be output on the touch screen display of the electronic device or the display of the external device, as a virtual screen for processing the input event. According to an embodiment, the dummy view may include a transparent window and/or a transparent layer, or may be output on a display in the form of an icon or image. For example, the DoP mobile manager 720 may process an input event for operations such as dragging, dropping, copying, and pasting, using the dummy view.

According to an embodiment, the DoP mobile manager 720 may simulate a virtual touch event, using the dummy view. For example, after the user input (e.g., drag and drop input) is terminated, the DoP mobile manager 720 may generate a virtual touch event to process a user input in the operating system of the electronic device.

According to an embodiment, the DoP mobile manager 720 may determine a location (e.g., a folder) where data (e.g., a file) is to be migrated (stored). According to an embodiment, when the data having the same name is present at the location where the data is migrated, the DoP mobile manager 720 may change the name of the corresponding data.

According to an embodiment, the DoP mobile manager 720 may store ID associated with data transmission and data information. For example, the DoP mobile manager 720 may store the received data-related information and the ID associated with data transmission in a storage space (e.g., some regions of the memory 130 of FIG. 1 or some regions of the memory 440 of FIG. 4) controlled by the DoP mobile manager 720.

According to an embodiment, in operation 707, the DoP mobile manager 720 may call the target application 730 corresponding to the sub-window in which a drop has occurred. For example, the DoP mobile manager 720 may call an onDrop function in an application. For example, the DoP mobile manager 720 may deliver information necessary for data transmission to the target application 730. For example, the DoP mobile manager 720 may deliver, to the target application 730, a label indicating that a drop input is applied to a window (or sub-window), an ID (Extra) generated upon migrating data, or information about data name and a path (e.g., file URI information) of a location where data is to be stored.

According to an embodiment, in operation 709, the target application 730 may identify the attribute of the application. For example, the properties of the application may include information about whether the application is an application supporting data (e.g., file) migration (transmission).

According to an embodiment, in operation 711, the target application 730 may deliver information about the attribute of the application to the DoP mobile manager 720 when the attribute of the application supports data migration, According to an embodiment, when there is a location where data is to be migrated, the target application 730 may deliver information about the corresponding location to the DoP mobile manager 720 together. For example, the target application 730 may deliver, to the DoP mobile manager 720, information about a location where data is stored.

According to an embodiment, in operation 713, the DoP mobile manager 720 may set data reception path information. For example, the DoP mobile manager 720 may set data reception path information to a location set by default. For example, the DoP mobile manager 720 may set data reception path information based on the information received from the target application 730. For example, the data reception path information may be information about a location (path) of a memory of the electronic device that stores data received from the external device.

According to an embodiment, in operation 715, the DoP mobile manager 720 may deliver an event (request) for starting data migration to the DoP PC manager 710. For example, the DoP mobile manager 720 may make a request for data transmission to the DoP PC manager 710. According to an embodiment, the DoP mobile manager 720 may deliver the set data reception path information to the DoP PC manager 710.

According to an embodiment in operation 717, the DoP PC manager 710 may deliver data (e.g., file) corresponding to the received input to the DoP mobile manager 720, For example, the DoP PC manager 710 may deliver, to the DoP mobile manager 720, an event indicating the start, completion, or failure of data transmission. For example, when transmitting pieces of data, the DoP PC manager 710 may deliver, to the DoP mobile manager 720, the start, completion, or failure of transmission of each data. For example, when the whole pieces of data are completely transmitted, the DoP PC manager 710 may deliver, to the DoP mobile manager 720, an event for providing a notification of the completion.

According to an embodiment, in operation 719; the DoP mobile manager 720 may deliver data to the target application. According to an embodiment, when the transmission of all data corresponding to the input is completed, the DoP mobile manager 720 may deliver an event for providing a notification of the completion, to an application. (e.g., the target application 730 and/or a file management application) in the electronic device. According to an embodiment, the DoP mobile manager 720 may store data received from an external device (e.g., the DoP PC manager 710) in the set path (location).

According to various embodiments; operation 721, operation 723, and operation 725 describe operations in the case where data transmission is canceled during data transmission. For example, when data transmission is not canceled, operation 721, operation 723, and operation 725 may be omitted.

According to an embodiment, in operation 721, the DoP PC manager 710 may recognize a user input for canceling data transmission. For example, during file transmission, the DoP PC manager 710 may output information about the data transmission status and a UI for canceling data transmission, on the display of the external device. For example, the DoP mobile manager 720 may provide the display of the external device with data transmission progress and an option to cancel file transmission in a pop-up form.

According to an embodiment, in operation 723, when the data transmission is canceled by a user input, the DoP PC manager 710 may deliver an event indicating this to the DoP mobile manager 720.

Figure 8:
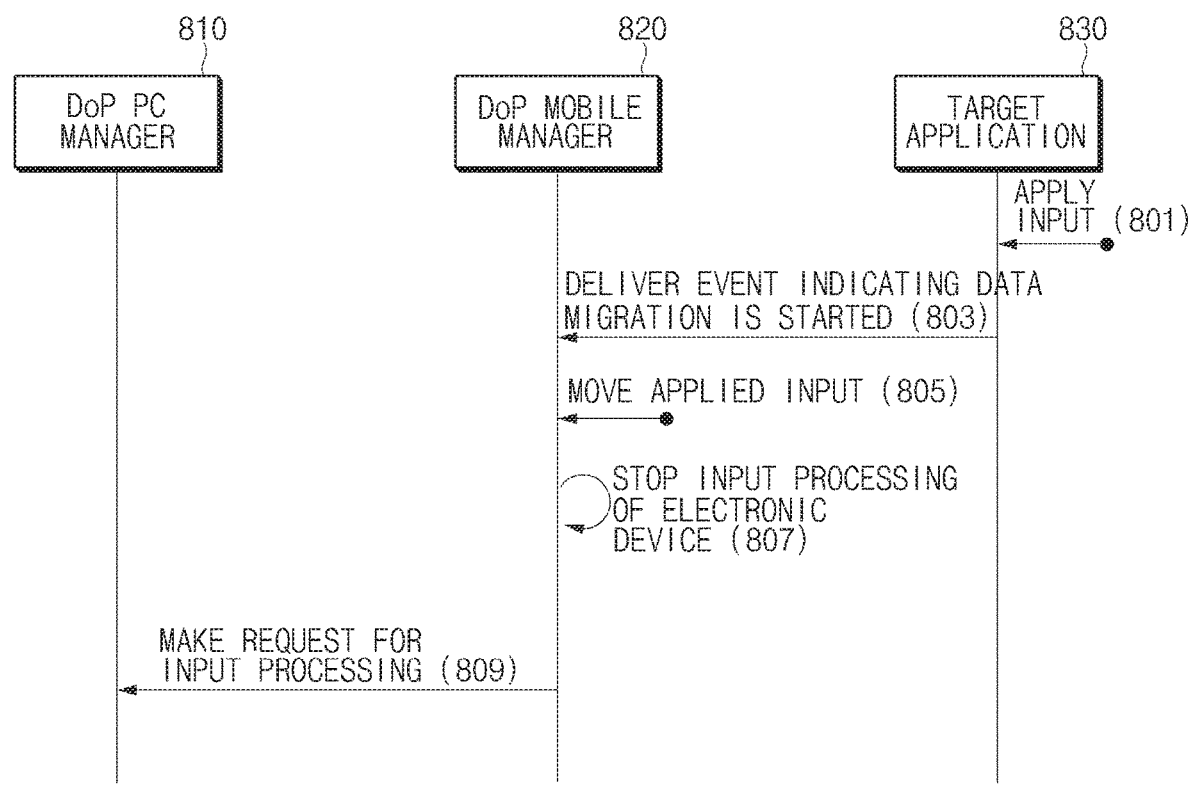
FIG. 8 is a flowchart of a data sharing operation of an electronic device according to an embodiment of the disclosure.

According to an embodiment, in operation 725, the DoP mobile manager 720 may deliver an event indicating that data transmission has been canceled, to the application (e.g., the target application 730), FIG. 8 illustrates a flowchart of a data sharing operation of an electronic device (e.g., the electronic device 101 of FIG. 1, the electronic device 400 of FIG. 4, and the electronic device 500 of FIG. 5) according to an embodiment of the disclosure.

For example, as illustrated in FIG. 6B, FIG. 8 shows operations in the case where data is moved from a screen (window) associated with an electronic device to a screen associated with an external device, while the electronic device is connected to the external device.

According to an embodiment, when the electronic device is connected to the external device, the electronic device may display the window associated with the electronic device in the first region of the display of the external device and may output a sub-window corresponding to at least one application stored in the electronic device, in a window. For example, the screen associated with the external device may be output in the second region of the display of the external device. For example, the operating system (e.g., Android operating system) of the electronic device may be different from that of the external device (e.g., Windows operating system).

Referring to FIG. 8, according to an embodiment, in operation 801, an input (e.g., a drag input) to select and move data in a sub-window corresponding to an application may be applied through the external device. For example, a DoP PC manager 810 may recognize an input to select and move data in a sub-window.

According to an embodiment, in operation 803, a target application 830 corresponding to the input-applied sub-window may deliver, to a DoP mobile manager 820, an event indicating that data migration is started. According to an embodiment, when the input to migrate data is not out of a window range associated with the electronic device, the DoP mobile manager 820 may cause the input processing mechanism in the operating system of the electronic device to operate. For example, another program (e.g., a view manager) may process the applied input under the operating system of the electronic device.

According to an embodiment, in operation 805, the DoP mobile manager 820 may recognize that the applied input is out of the boundary of a window associated with the electronic device output to the display of the external device.

According to an embodiment, in operation 807, the DoP mobile manager 820 may stop the input processing mechanism in the operating system of the electronic device.

According to an embodiment, in operation 809, the DoP mobile manager 820 may deliver an event indicating that the applied input has crossed the boundary of the output window, in which the applied input is output, and then led to the screen associated with the external device such that the external device is capable of continuously processing inputs. For example, the DoP mobile manager 820 may request the DoP PC manager 810 to process the applied input to continuously process inputs, which have been processed in the operating system of the electronic device, in the operating system of the external device. For example, the DoP mobile manager 820 may deliver, to the DoP PC manager 810, information (e.g., coordinate information, or information associated with data corresponding to an input) associated with an input.

Figure 9:
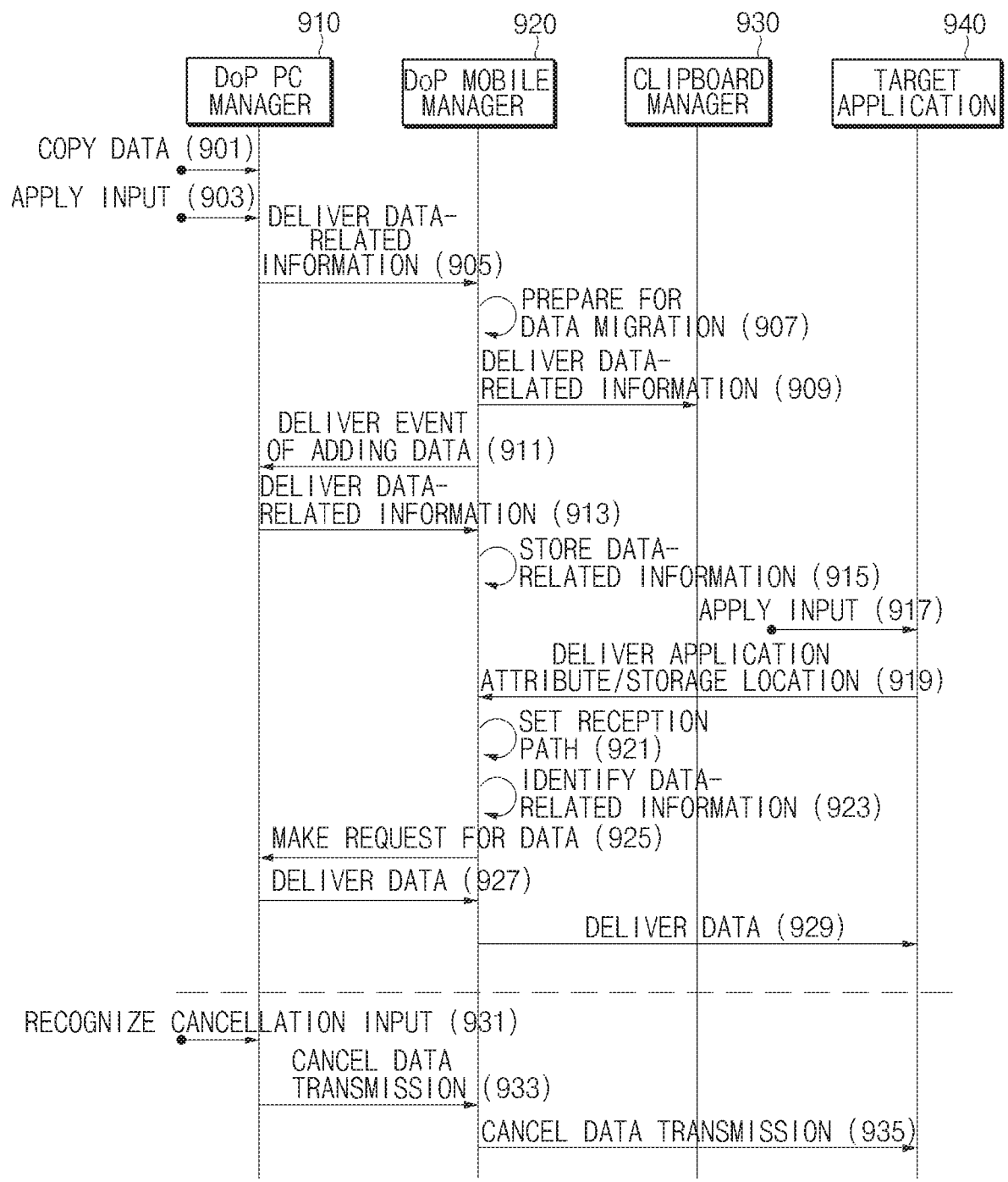
FIG. 9 is a flowchart of a data sharing operation of an electronic device according to an embodiment of the disclosure.

FIG. 9 illustrates a flowchart of a data sharing operation of an electronic device (e.g., the electronic device 101 of FIG. 1, the electronic device 400 of FIG. 4, and the electronic device 500 of FIG. 5) according to an embodiment of the disclosure.

For example, FIG. 9 shows operations in the case where data of an external device is copied and then the data is pasted to an electronic device.

According to an embodiment, when the electronic device is connected to the external device, the electronic device may display the window associated with the electronic device in the first region of the display of the external device and may output a sub-window corresponding to at least one application stored in the electronic device, in a window. For example, the screen associated with the external device may be output in the second region of the display of the external device. For example, the operating system (e.g., Android operating system) of the electronic device may be different from that of the external device (e.g., Windows operating system).

Referring to FIG. 9, according to an embodiment, in operation 901, the external device may copy data (e.g., a folder, a file, a text, or HTML) depending on a user input in the operating system of the external device. For example, the external device may store data copied in the clipboard of the external device. For example, a DoP PC manager 910 may recognize that a user input to select and copy specific data displayed in the second region is applied.

According to an embodiment, in operation 903, the DoP PC manager 910 may recognize that an input to a window associated with the electronic device is applied. For example, the DoP PC manager 910 may detect an input to select or focus a window associated with an electronic device.

According to an embodiment, in operation 905, the DoP PC manager 910 may deliver, to a DoP mobile manager 920, information (e.g., the name, size, or storage location information of stored data) about data last stored in the clipboard of the external device.

According to an embodiment, in operation 907, the DoP mobile manager 920 may prepare for data migration. According to an embodiment, the DoP mobile manager 920 may determine whether there is data with the same name at the location (e.g., a location where data is to be stored) where the data is to be migrated, According to an embodiment, when the data with the same name is present at the location where the data is migrated, the DoP mobile manager 920 may change the name of the corresponding data.

According to an embodiment, in operation 907, the DoP mobile manager 920 may generate an ID to be used upon migrating data. For example, the DoP mobile manager 920 may generate an ID corresponding to an event of moving each data.

According to an embodiment, in operation 909, the DoP mobile manager 920 may deliver information about data to be migrated to a clip mode manager, According to an embodiment, a clipboard manager 930 may add the corresponding data as clip data to the clipboard of the electronic device based on information about the data. According to an embodiment, the clipboard manager 930 may set clip data based on information about data before migration (transmission) of actual data is completed. For example, the clip data may include at least part of information about a path (location) where the actual data is stored, According to an embodiment, the clipboard manager 930 may provide a UI (e.g., a folder icon) indicating that the corresponding data has been copied in the clipboard, based on the information of the clip data before the transmission of actual data is completed.

According to an embodiment, in operation 911, the DoP mobile manager 920 may deliver, to the DoP PC manager 910, an event indicating that the electronic device (e.g., the clipboard manager 930) has added data as clip data to the clipboard of the electronic device.

According to an embodiment, in operation 913, the DoP PC manager 910 recognizes that data-related clip data has been added by the electronic device, and may deliver data-related information to the DoP mobile manager 920. For example, the DoP PC manager 910 may deliver, to the DoP mobile manager 920, an ID associated with data transmission, data name, data ID, and/or other data-related information.

According to an embodiment, in operation 915, the DoP mobile manager 920 may store data-related information received from the DoP PC manager 910. For example, the DoP mobile manager 920 may store the received data-related information and the ID associated with data transmission in a storage space controlled by the DoP mobile manager 920.

According to an embodiment, in operation 917, a user input may be applied to a sub-window corresponding to a specific application displayed on the display of the external device. For example, a paste input for data copied in the clipboard may be applied to a specific sub-window. According to an embodiment, when the input is applied, an event for a paste input may be delivered to a target application 940 corresponding to an input-applied sub-window through the DoP PC manager 910 and the DoP mobile manager 920. According to an embodiment, upon delivering the event, the target application 940 may read out clip data stored in the clipboard of the electronic device.

According to an embodiment, the DoP mobile manager 920 may call the target application 940 corresponding to the sub-window in which an input (e.g., paste) has occurred. For example, the DoP mobile manager 920 may deliver information necessary for data transmission to the target application 940. For example, the DoP mobile manager 920 may deliver, to the target application 940, a label indicating that the paste input is applied to a window (or sub-window), an ID (Extra) generated upon migrating data, or information about data name and a path (e.g., file URI information) of a location where data is to be stored.

According to an embodiment, in operation 919, the target application 940 may identify the attribute of the application. For example, the properties of the application may include information about whether the application is an application supporting the transmission of data (e.g., a file, a text, or HTML). According to an embodiment, the target application 940 may transmit information about the attribute of the application to the DoP mobile manager 920 when the attribute of the application supports data migration. According to an embodiment, when there is a location where data is to be migrated, the target application 940 may deliver information about the corresponding location to the DoP mobile manager 920 together. For example, the target application 940 may deliver, to the DoP mobile manager 920, information about a location where data is stored.

According to an embodiment, in operation 921, the DoP mobile manager 920 may set data reception path information. For example, the DoP mobile manager 920 may set data reception path information to a location set by default. For example, the DoP mobile manager 920 may set data reception path information based on the information received from the target application 940. For example, the data reception path information may be information about a location (path) of a memory of the electronic device that stores data received from the external device.

According to an embodiment, in operation 923, the DoP mobile manager 920 may read out data-related information. For example, the DoP mobile manager 920 may read out an ID associated with data transmission and the data-related information stored in a storage space controlled by the DoP mobile manager 920.

According to an embodiment, in operation 925, the DoP mobile manager 920 may deliver an event for starting data migration to the DoP PC manager 910. For example, the DoP mobile manager 920 may make a request for data transmission to the DoP PC manager 910. According to an embodiment, the DoP mobile manager 920 may deliver the set data reception path information to the DoP PC manager 910.

According to an embodiment, in operation 927, the DoP PC manager 910 may deliver data (e.g., a folder, a file, a text, or HTML) corresponding to the received input to the DoP mobile manager 920. For example, the DoP PC manager 910 may deliver, to the DoP mobile manager 920, an event indicating the start, completion, or failure of data transmission. For example, when transmitting pieces of data, the DoP PC manager 910 may deliver, to the DoP mobile manager 920, the start, completion, or failure of transmission of each data. For example, when the whole pieces of data are completely transmitted, the DoP PC manager 910 may deliver, to the DoP mobile manager 920, an event for providing a notification of the completion.

According to an embodiment, in operation 929, when the transmission of all data corresponding to the input is completed, the DoP mobile manager 920 may deliver an event for providing a notification of the completion, to an application (e.g., the target application 940 and/or a file management application) in the electronic device. According to an embodiment, the DoP mobile manager 920 may store data received from an external device (e.g., the DoP PC manager 910) in the set path (location).

According to various embodiments, operation 931, operation 933, and operation 935 describe operations in the case where data transmission is canceled during data transmission. For example, when data transmission is not canceled, operation 931, operation 933, and operation 935 may be omitted.

According to an embodiment, in operation 931, the DoP PC manager 910 may recognize a user input for canceling data transmission. For example, during file transmission, the DoP PC manager 910 may output information about the data transmission status and a UI for canceling data transmission, on the display of the external device.

According to an embodiment, in operation 933, when the data transmission is canceled by a user input, the DoP PC manager 910 may deliver an event indicating this to the DoP mobile manager 920.

According to an embodiment, in operation 935, the DoP mobile manager 920 may deliver an event indicating that data transmission has been canceled, to the application (e.g., the target application 940).

Figure 10:
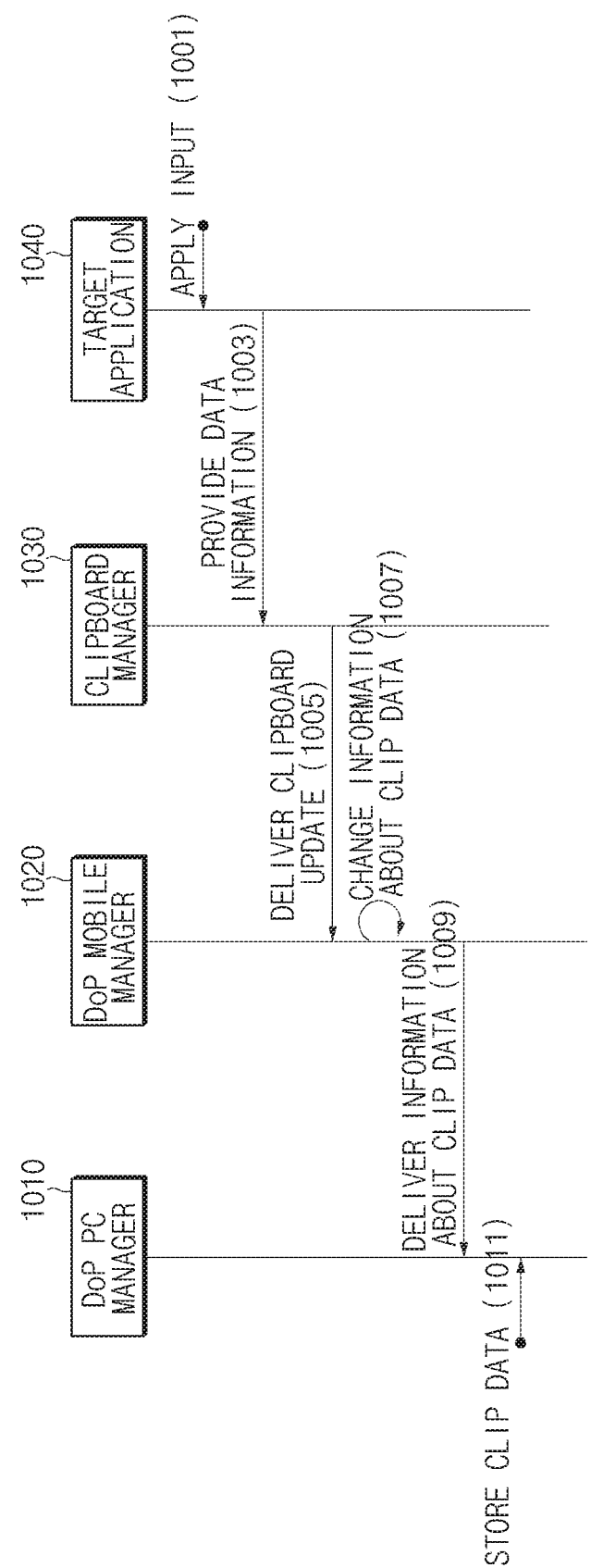
FIG. 10 is a flowchart of a data sharing operation of an electronic device according to an embodiment of the disclosure.

FIG. 10 illustrates a flowchart of a data sharing operation of an electronic device (e.g., the electronic device 101 of FIG. 1, the electronic device 400 of FIG. 4, and the electronic device 500 of FIG. 5) according to an embodiment of the disclosure.

For example, FIG. 10 shows operations in the case where data of an electronic device is copied and then the data is pasted to an external device.

According to an embodiment, when the electronic device is connected to the external device, the electronic device may display the window associated with the electronic device in the first region of the display of the external device and may output a sub-window corresponding to at least one application stored in the electronic device, M a window. For example, the screen associated with the external device may be output in the second region of the display of the external device. For example, the operating system (e.g., Android operating system) of the electronic device may be different from that of the external device (e.g., Windows operating system).

Referring to FIG. 10, according to an embodiment, in operation 1001, a user input for copying data (e.g., a file, a text, or HTML) displayed in a sub-window may be applied through an external device. For example, a target application 1040 corresponding to the input-applied sub-window may recognize information about data corresponding to the user input.

According to an embodiment, in operation 1003, the target application 1040 may provide a clipboard manager 1030 with information about data corresponding to the user input. According to an embodiment, the clipboard manager 1030 may store the data as clip data in the clipboard.

According to an embodiment, in operation 1005, the clipboard manager 1030 may deliver, to a DoP mobile manager 1020, an event indicating that the clipboard has been updated.

According to an embodiment, in operation 1007, the DoP mobile manager 1020 may change information about clip data (e.g., storage path (location) information of clip data) to a format recognized by the external device. For example, when the electronic device uses the Android operating system and the external device uses the Windows operating system, the DoP mobile manager 1020 may change the data format of Android to the media transfer protocol (mtp) format of Windows.

According to an embodiment, in operation 1009, an input to the second region may be applied through the external device. According to an embodiment, when the input to the second region where a screen for the external device is displayed is applied, the DoP mobile manager 1020 may deliver clip data and information (e.g., path information of data, of which the format is changed) about the clip data to a DoP PC manager 1010. According to an embodiment, the DoP PC manager 1010 may add the received clip data to the clipboard of the external device.

According to an embodiment, in operation 1011 when recognizing that a paste input is applied in the second region, the DoP PC manager 1010 may store clip data added to the clipboard of the external device in the set path based on information about the received data.

Figure 11:
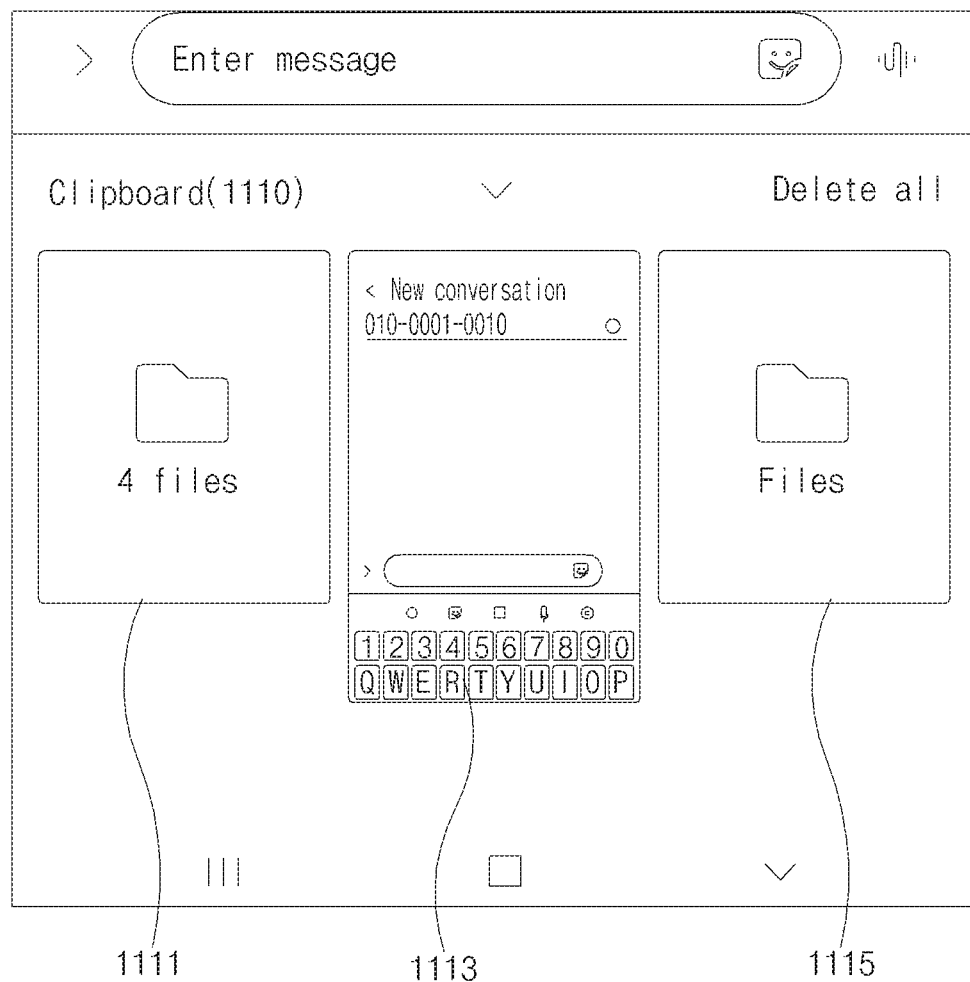
FIG. 11 illustrates clip data copied in a clipboard of an electronic device according to an embodiment of the disclosure.

According to various embodiments, an embodiment is exemplified in FIGS. 7 to 10 as the DoP mobile manager 1020 of the electronic device and the DoP PC manager 1010 of the external device operate in conjunction with each other to perform a data sharing operation. However, the data sharing operations of FIGS. 7 to 10 may be performed by the processor of the electronic device and the processor of the external device, FIG. 11 illustrates clip data copied in a clipboard of an electronic device according to an embodiment of the disclosure.

According to an embodiment, an electronic device (e.g., the electronic device 101 in FIG. 1, the electronic device 400 in FIG. 4, and the electronic device 500 in FIG. 5) may receive information (e.g., the path (location) information of data) about data stored in the clipboard of an external device, from the connected external device. For example, the information about data may be a file URI used by the external device. According to an embodiment, the electronic device may add the corresponding data as clip data to the clipboard of the electronic device based on information about data received from the external device. For example, a piece or pieces of clip data may be added to the clipboard of the electronic device.

According to an embodiment, the electronic device may display clip data copied to the clipboard of the electronic device. For example, the electronic device may display data (e.g., a file, an image, a text, or HTML) copied to the clipboard of the electronic device.

For example, when information about data received from an external device is displayed as clip data, a user may not receive intuitive information through the path information (e.g., a file URI) of data.

Referring to FIG. 11, according to an embodiment, when the electronic device displays the copied data in the clipboard 1110 of the electronic device, clip data that is copied from the clipboard of the external device and added to the clipboard 1110 of the electronic device may be displayed as an intuitive UI (e.g., a folder icon) 1111 or 1115. According to an embodiment, when the electronic device displays the data copied in the clipboard 1110, the electronic device may display the data (e.g., the captured image) copied in the clipboard 1110 as it is in the case of data 1113 (e.g., an image, a text, or a file name) that is copied in the electronic device and then is stored as clip data. For example, the stored data 1113 illustrated in FIG. 11 indicates an image obtained by capturing a screen displayed on a touch screen display of an electronic device depending on a user input. However, according to various embodiments, the copied data displayed on the clipboard 1110 is not limited thereto.

According to an embodiment, when displaying the copied clip data on the clipboard 1110 of electronic device, the electronic device may allow a user to easily and intuitively recognize clip data by displaying a UI indicating that the copied clip data is present instead of the specific information (e.g., file URI) associated with the data. For example, the UI 1111 or 1115 indicates that copied clip data is present, and may include text indicating the number or type of related clip data. For example, the UI 1111 may include text indicating that four pieces of copied clip data (e.g., file (file URI)) are present; the UI 1115 may include text indicating that a piece of copied clip data is present, FIG. 12 illustrates a flowchart of a data sharing method of an electronic device (e.g., the electronic device 101 of FIG. 1, the electronic device 400 of FIG. 4, and the electronic device 500 of FIG. 5) according to an embodiment of the disclosure.

Figure 12:
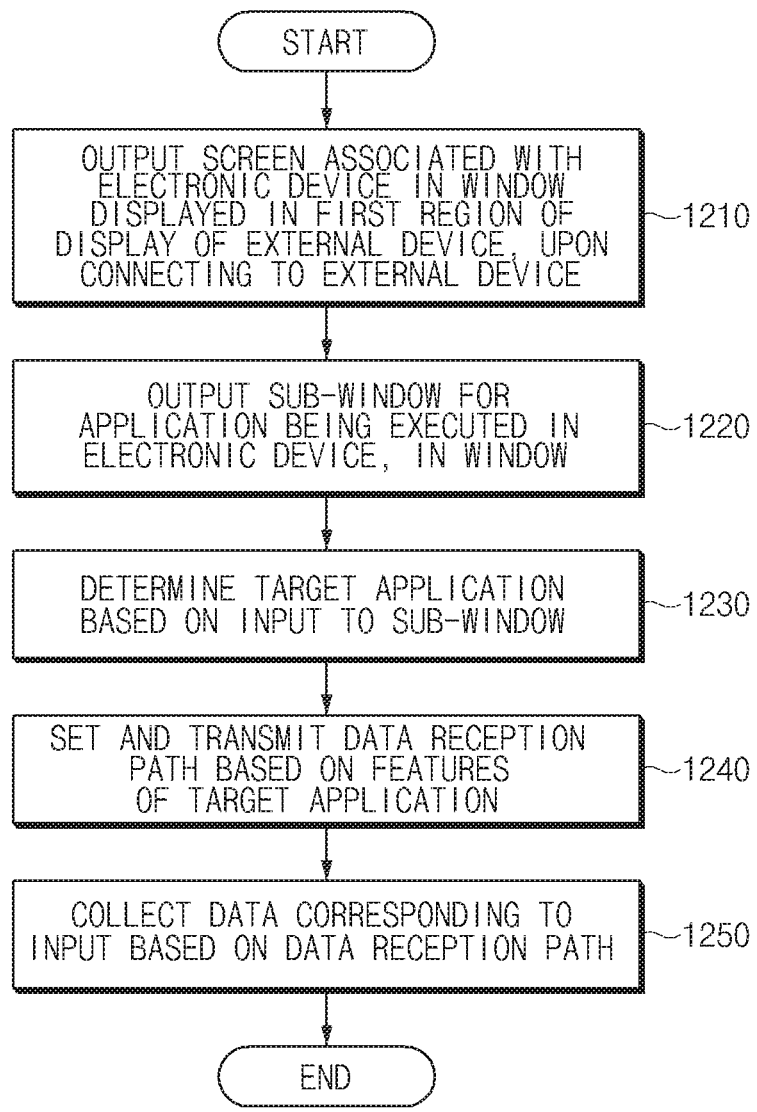
FIG. 12 is a flowchart of a data sharing method of an electronic device according to an embodiment of the disclosure.

Referring to FIG. 12, the operations of the data sharing method of FIG. 12 may be performed by a processor (e.g., the processor 120 of FIG. 1 or the processor 450 of FIG. 4) of an electronic device (e.g., the electronic device 101 of FIG. 1, the electronic device 400 of FIG. 4, or the electronic device 500 of FIG. 5).

According to an embodiment, in operation 1210, when the electronic device is connected to an external device, the electronic device may output a window associated with the electronic device in the first region of the display of the external device. According to an embodiment, the external device may use an operating system (e.g., Windows operating system) different from the operating system (e.g., Android operating system) of the electronic device. According to an embodiment, the electronic device may reconstruct a screen displayed on the touch screen display of the electronic device, and may output the reconstructed screen to the window of the first region. For example, when the electronic device is connected to the external device, the electronic device may change screen configuration information associated with at least part of the resolution, density, or orientation of the screen output by the touch screen display of the electronic device. For example, the electronic device may organize a window based on the changed screen configuration information, and may output the organized window to the first region.

According to an embodiment, the electronic device may display the screen associated with the external device, in the second region other than the first region in the display of the external device. For example, the screen organized by the operating system of the electronic device may be output in the first region (window) of the display of the external device; the screen organized by the operating system of the external device may be output in the second region.

According to an embodiment, in operation 1220, the electronic device may output a sub-window corresponding to at least one application stored in the electronic device in the output window. For example, the electronic device may output a sub-window corresponding to at least one respective application being executed in the electronic device, in the window of the first region. According to an embodiment, when the electronic device is connected to the external device, the electronic device may organize the sub-window corresponding to the application, based on the changed screen configuration information and may output the organized sub-window in the first region. For example, data (e.g., a file, a text, an image, or HTML) associated with the corresponding application may be displayed in the sub-window.

According to an embodiment, in operation 1230, when an input to a sub-window is applied from an external device, the electronic device may determine a target application based on the input. For example, the input to the sub-window may include a drag input from a second region to a point in the sub-window. For example, when a drag input to move specific data (e.g., a file) displayed in the second region from the external device into the sub-window is applied, the electronic device may determine that an application corresponding to the sub-window is a target application.

According to an embodiment, when an input to the window is applied from the external device, the electronic device may determine whether there is clip data copied from the external device. For example, when an input for selecting or focusing a window of the first region is applied from the external device, the electronic device may determine whether there is clip data copied in the clipboard of the external device. According to an embodiment, when an input for selecting or focusing the window of the first region is applied from the external device, the electronic device may receive path information about clip data copied from the external device. According to an embodiment, the electronic device may provide the clipboard of the electronic device with information associated with the copied clip data, based on path information about the copied clip data.

According to an embodiment, in the case where the copied data is present in the clipboard of the electronic device, when an input to the second region is applied from external device, the electronic device may transmit, to the external device, at least part of data copied in the clipboard of the electronic device. For example, in the case where the data copied in the clipboard of the electronic device is present, when an input for selecting or focusing the second region is applied from the external device, the electronic device may transmit, to the external device, at least part (e.g., the most recently copied data) of data copied in the clipboard of the electronic device. For example, the electronic device may allow the external device to set the data transmitted as clip data of the external device.

According to an embodiment, after the input to the window is applied from the external device, the input to the sub-window may be additionally applied. For example, after an input for focusing a window is applied from the external device, an input for pasting clip data stored in the clipboard of the external device in a specific sub-window may be applied.

According to an embodiment, in operation 1240, the electronic device may set data reception path information based on the features of the target application. For example, the electronic device may identify the features of a target application. For example, the features of the application may include information about whether the application supports data migration or whether the application supports data attachment.

According to an embodiment, the electronic device may set data reception path information based on the attribute of an application. For example, when the target application is an application supporting the data attachment, the electronic device may recognize a storage path for a location where the attached data is stored. For example, an application supporting data attachment may attach data stored in the hidden folder. According to an embodiment, the electronic device may set the data reception path information based on the recognized storage path and transmit the data reception path information to the external device.

According to an embodiment, the electronic device may receive path information of data corresponding to an input to the sub-window from the external device, and may determine whether the data corresponding to the input is capable of being applied to the target application, based on the received path information of the data. For example, the electronic device may determine whether the corresponding data is capable of being applied to the target application, based on information associated with the data received from the external device. According to an embodiment, when the data corresponding to the input is incapable of being supported or applied in the target application, the electronic device may provide a notification thereof through the display of the external device.

According to an embodiment, when a drag input from the first region to the second region is applied from the external device, the electronic device may transmit path information of data corresponding to the drag input to the external device.

According to an embodiment, in operation 1250, the electronic device may receive data corresponding to an input from an external device based on data reception path information. According to an embodiment, the electronic device may store the received data in the set data reception path.

According to an embodiment, a data sharing method of an electronic device may include outputting a screen associated with the electronic device in a window displayed in a first region of a display of the external device when the electronic device is connected through an input/output interface to an external device using an operating system different from an operating system of the electronic device, outputting a sub-window corresponding to at least one application stored in the electronic device within the window, determining a target application based on the input when an input to the sub-window is applied from the external device, setting data reception path information based on a feature of the target application to transmit the set data reception path information to the external device, and receiving data corresponding to the input from the external device based on the data reception path information.

According to an embodiment, a screen associated with the external device may be displayed in a second region other than the first region in the display of the external device.

According to an embodiment, the input to the sub-window may include a drag input from the second region to one point within the sub-window.

According to an embodiment, the method may further include receiving path information about clip data copied in the external device when an input to the window is applied from the external device.

According to an embodiment, the input to the window may include an input for selecting or focusing the window.

According to an embodiment, the method may further include providing information associated with the copied clip data to a clipboard of the electronic device based on the path information about the copied clip data.

According to an embodiment, the method may further include changing screen configuration information associated with at least part of a resolution, density, or orientation of a screen output by the electronic device when the electronic device is connected to the external device, organizing the sub-window corresponding to the at least one application based on the changed screen configuration information, and causing the external device to display the sub-window in the first region.

According to an embodiment, the method may further include transmitting at least part of data copied in a clipboard of the electronic device, to the external device when an input to the second region is applied from the external device, and setting the at least part of the copied data as clip data of the external device.

According to an embodiment, the method may further include transmitting path information of data corresponding to the drag input, to the external device when a drag input from the first region to the second region is applied from the external device.

According to an embodiment, the method may further include receiving path information of data corresponding to the input from the external device when the input to the sub-window is applied from the external device, and determining whether data corresponding to the input is applicable to the target application, based on the path information of the data.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in this specification, it is possible to share data between different types of devices.

According to embodiments disclosed in this specification, upon transmitting data between different types of devices, it is possible to improve user convenience.

According to embodiments disclosed in this specification, it is possible to improve user convenience and efficiency upon transmitting data between an electronic device and an external device, by providing a screen associated with the electronic device together with the screen associated with the external device connected to the electronic device.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a touch screen display;
   an input/output interface connected to an external device;
   a memory; and
   at least one processor electrically connected to the touch screen display, the input/output interface, and the memory,
   wherein the at least one processor is configured to:
   based on the electronic device being connected through the input/output interface to the external device using an operating system different from an operating system of the electronic device, output a screen associated with the electronic device within a window displayed in a first region of a display of the external device;
   output a sub-window corresponding to at least one application stored in the electronic device within the window;
   based on an input to the sub-window being applied from the external device, determine a target application based on the input;
   set data reception path information based on a feature of the target application to transmit the set data reception path information to the external device; and
   receive data corresponding to the input from the external device based on the data reception path information.

2. The electronic device of claim 1, wherein the at east one processor is further configured to:
   display a screen associated with the external device in second region other than the first region in the display of the external device.

3. The electronic device of claim 2, wherein the input to the sub-window includes a drag input from the second region to one point within the sub-window.

4. The electronic device of claim 1, wherein the at east one processor is further configured to:
   based on an input to the window being applied from the external device, receive path information about clip data copied in the external device.

5. The electronic device of claim 4, wherein the input to the window includes an input for selecting or focusing the window.

6. The electronic device of claim 4, wherein the at least one processor is further configured to:
   provide information associated with the copied clip data to a clipboard of the electronic device based on the path information about the copied clip data.

7. The electronic device of claim 1, wherein the at least one processor is further configured to:
   based on the electronic device being connected to the external device, change screen configuration information associated with at least part of a resolution, density, or orientation of a screen output by the electronic device;
   organize the sub-window corresponding to the at least one application based on the changed screen configuration information; and
   cause the external device to display the sub-window in the first region.

8. The electronic device of claim 2, wherein the at least one processor is further configured to:
   based on an input to the second region being applied from the external device, transmit at least part of data copied in a clipboard of the electronic device, to the external device; and
   set the at least part of the copied data as clip data of the external device.

9. The electronic device of claim 2, wherein the at least one processor is further configured to:
   based on a drag input from the first region to the second region being applied from the external device, transmit path information of data corresponding to the drag input, to the external device.

10. The electronic device of claim 1, wherein the at least one processor is further configured to:
based on the input to the sub-window being applied from the external device, receive path information of data corresponding to the input from the external device; and
determine whether data corresponding to the input is applicable to the target application, based on the path information of the data.

11. A method of data sharing of an electronic device, the method comprising:
based on the electronic device being connected through an input/output interface to an external device using an operating system different from an operating system of the electronic device, outputting a screen associated with the electronic device in a window displayed in a first region of a display of the external device;
outputting a sub-window corresponding to at least one application stored in the electronic device within the window;
based on an input to the sub-window being applied from the external device, determining a target application based on the input;
setting data reception path information based on a feature of the target application to transmit the set data reception path information to the external device; and
receiving data corresponding to the input from the external device based on the data reception path information.

12. The method of claim 11, wherein a screen associated with the external device is displayed in a second region other than the first region in the display of the external device.

13. The method of claim 12, wherein the input to the sub-window includes a drag input from the second region to one point within the sub-window.

14. The method of claim 11, further comprising:
based on an input to the window being applied from the external device, receiving path information about clip data copied in the external device.

15. The method of claim 14, wherein the input to the window includes an input for selecting or focusing the window.

16. The method of claim 14, further comprising:
providing information associated with the copied clip data to a clipboard of the electronic device based on the path information about the copied clip data.

17. The method of claim 11, further comprising:
based on the electronic device being connected to the external device, changing screen configuration information associated with at least part of a resolution, density, or orientation of a screen output by the electronic device;
organizing the sub-window corresponding to the at east one application based on the changed screen configuration information; and
causing the external device to display the sub-window in the first region.

18. The method of claim 12, further comprising:
based on an input to the second region being applied from the external device, transmitting at least part of data copied in a clipboard of the electronic device, to the external device; and
setting the at least part of the copied data as clip data of the external device.

19. The method of claim 12, further comprising:
based on a drag input from the first region to the second region being applied from the external device, transmitting path information of data corresponding to the drag input, to the external device.

20. The method of claim 11, further comprising:
based on the input to the sub-window being applied from the external device, receiving path information of data corresponding to the input from the external device; and
determining whether data corresponding to the input is applicable to the target application, based on the path information of the data.

* * * * *